US012790545B2

(12) United States Patent
Schuck et al.

(10) Patent No.: US 12,790,545 B2
(45) Date of Patent: Nov. 10, 2026

(54) SYSTEM AND METHOD FOR PROVIDING AND/OR FACILITATING GIANT NONLINEAR OPTICAL RESPONSES FROM PHOTON AVALANCHING NANOPARTICLES

(71) Applicants: THE TRUSTEES OF COLUMBIA UNIVERSITY IN THE CITY OF NEW YORK, New York, NY (US); KOREA RESEARCH INSTITUTE OF CHEMICAL TECHNOLOGY, DaeJeon (KR); THE REGENTS OF THE UNIVERSITY OF CALIFORNIA, Oakland, CA (US)

(72) Inventors: P. James Schuck, New York, NY (US); Changhwan Lee, New York, NY (US); Emma Xu, New York, NY (US); Kaiyuan Yao, New York, NY (US); Emory Chan, Oakland, CA (US); Bruce Cohen, San Francisco, CA (US); Yung Doug Suh, Seoul (KR); Sang Hwan Nam, Seoul (KR)

(73) Assignees: THE TRUSTEES OF COLUMBIA UNIVERSITY IN THE CITY OF NEW YORK, New York, NY (US); KOREA RESEARCH INSTITUTE OF CHEMICAL TECHNOLOGY, DaeJeon (KR); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 258 days.

(21) Appl. No.: 17/531,266

(22) Filed: Nov. 19, 2021

(65) Prior Publication Data

US 2022/0163384 A1 May 26, 2022

Related U.S. Application Data

(60) Provisional application No. 63/116,216, filed on Nov. 20, 2020.

(51) Int. Cl.
*C09K 11/77* (2006.01)
*G01J 1/44* (2006.01)

(52) U.S. Cl.
CPC ... *C09K 11/7773* (2013.01); *G01J 2001/4466* (2013.01)

(58) Field of Classification Search
CPC ..................... C09K 11/7773; G01J 2001/4466
See application file for complete search history.

(56) References Cited

U.S. PATENT DOCUMENTS

2002/0179886 A1* 12/2002 Kumar ............... C09K 11/7792 252/301.4 R

FOREIGN PATENT DOCUMENTS

| | | | |
|---|---|---|---|
| CN | 1962932 | * | 5/2007 |
| CN | 103623436 | * | 3/2014 |
| CN | 108384547 | * | 8/2018 |

OTHER PUBLICATIONS

Heidari et al, "Investigation of Interaction between Synchrotron Radaition and Thulium Nanoparticles for Human Cancer Cells, Tissues and Tumors Treatement", European Journal of Scientific Exploration, vol. 2, No. 3, 2019, pp. 1-8, Oct. 28, 2019.*

(Continued)

*Primary Examiner* — C Melissa Koslow
(74) *Attorney, Agent, or Firm* — Hunton Andrews Kurth LLP

(57) ABSTRACT

Exemplary nanoparticle and method for inducing photon avalanching using a nanoparticle can be provided. The nanoparticle can include, for example, at least 99% thulium doped nanocrystals of the nanoparticle. The nanoparticle can be composed of solely thulium. An atomic concentration of the thulium can be at least 8%. A near infrared excitation wavelength of the nanocrystals can be greater than about 1064 nm. The near infrared excitation wavelength can be (Continued)

between about 1400 nm to about 1490 nm. A passivated shell(s) can be included which can surround the nanocrystals.

12 Claims, 15 Drawing Sheets

(56) References Cited

OTHER PUBLICATIONS

Liu et al, "Amplified stimulated emission in upconversion nanoparticles for super-resolution nanoscopy", Nature, ol. 543, pp. 229-233 and method pgs, Feb. 22, 2017.*
Turcotte, D. L. Self-organized criticality. Rep. Prog. Phys. 62, 1377-1429 (1999).
Ni, H. & Rand, S. C. Avalanche phase conjugation. Opt. Lett. 17, 1222-1224 (1992).
Chivian, J. S., Case, W. E. & Eden, D. D. The photon avalanche: A new phenomenon in Pr3+-based infrared quantum counters. Appl. Phys. Lett. 35, 124-125 (1979).
Lenth, W. & Macfarlane, R. M. Excitation mechanisms for upconversion lasers. J. Lumin. 45, 346-350 (1990).
Joubert, M.-F. Photon avalanche upconversion in rare earth laser materials. Optical 0 Materials 11, 181-203 (1999).
Auzel, F. Upconversion and Anti-Stokes Processes with f and d Ions in Solids. Chemical Reviews 104, 139-174 (2004).
Bednarkiewicz, A., Chan, E. M., Kotulska, A., Marciniak, L. & Prorok, K. Photon avalanche in lanthanide doped nanoparticles for biomedical applications: super-resolution imaging. Nanoscale Horizons 4, 881-889 (2019).
Thompson, M. A., Lew, M. D. & Moerner, W. E. Extending Microscopic Resolution with Single-Molecule Imaging and Active Control. Annual Review of Biophysics 41, 321-342 (2012).
Gustafsson, M. G.L. Nonlinear structured-illumination microscopy: Wide-field fluorescence imaging with theoretically unlimited resolution. Proceedings of the National Academy of Sciences of the United States of America 102, 13081 (2005).
Heintzmann, R. & Huser, T. Super-Resolution Structured Illumination Microscopy. Chemical Reviews 117, 13890-13908 (2017).
Denkova, D., Ploschner, M., Das, M., Parker, L. M., Zheng, X., Lu, Y., Orth, A., Packer, H. & Piper, J. A. 3D sub-diffraction imaging in a conventional confocal configuration by exploiting super-linear emitters. Nat. Commun. 10, 3695 (2019).
Liu, Y., Wang, F., Lu, H., Fang, G., Wen, S., Chen, C., Shan, X., Xu, X., Zhang, L., Stenzel, M. & Jin, D. Super-Resolution Mapping of Single Nanoparticles inside Tumor Spheroids. Small 16, 1905572 (2020).
Marciniak, L., Bednarkiewicz, A. & Elzbieciak, K. NIR-NIR photon avalanche based luminescent thermometry with Nd3 + doped nanoparticles. Journal of Materials Chemistry C 6, 7568-7575 (2018).
Pickel, A. D., Teitelboim, A., Chan, E. M., Borys, N. J., Schuck, P. J. & Dames, C. Apparent self-heating of individual upconverting nanoparticle thermometers. Nat. 35 Commun. 9, 4907 (2018).
Lay, A., Sheppard, O. H., Siefe, C., McLellan, C. A., Mehlenbacher, R. D., Fischer, S., Goodman, M. B. & Dionne, J. A. Optically Robust and Biocompatible Mechanosensitive Upconverting Nanoparticles. ACS Central Science 5, 1211-1222 (2019).
Xie, P. & Gosnell, T. R. Room-temperature upconversion fiber laser tunable in the red, orange, green, and blue spectral regions. Opt. Lett. 20, 1014-1016 (1995).
Guy, S., Joubert, M. F. & Jacquier, B. Photon avalanche and the mean-field approximation. Phys. Rev. B 55, 8240-8248 (1997).
Deng, H., Yang, S., Xiao, S., Gong, H.-M. & Wang, Q.-Q. Controlled Synthesis and Upconverted Avalanche Luminescence of Cerium(III) and Neodymium(III) Orthovanadate Nanocrystals with High Uniformity of Size and Shape. Journal of the American Chemical Society 130, 2032-2040 (2008).
Wang, Q.-Q., Han, J.-B., Guo, D.-L., Xiao, S., Han, Y.-B., Gong, H.-M. & Zou, X.-W. Highly Efficient Avalanche Multiphoton Luminescence from Coupled Au Nanowires in 5 the Visible Region. Nano Lett. 7, 723-728 (2007).
Ma, Z., Yu, Y., Shen, S., Dai, H., Yao, L., Han, Y., Wang, X., Han, J.-B. & Li, L. Origin of the Avalanche-Like Photoluminescence from Metallic Nanowires. Scientific Reports 6, 18857 (2016).
Liu, Y., Lu, Y., Yang, X., Zheng, X., Wen, S., Wang, F., Vidal, X., Zhao, J., Liu, D., Zhou, Z., Ma, C., Zhou, J., Piper, J. A., Xi, P. & Jin, D. Amplified stimulated emission in upconversion nanoparticles for super-resolution nanoscopy. Nature 543, 229-233 (2017).
Levy, E. S., Tajon, C. A., Bischof, T. S., Iafrati, J., Fernandez-Bravo, A., Garfield, D. J., Chamanzar, M., Maharbiz, M. M., Sohal, V. S., Schuck, P. J., Cohen, B. E. & Chan, E. M. Energy-Looping Nanoparticles: Harnessing Excited-State Absorption for Deep-Tissue Imaging. ACS Nano 10, 8423-8433 (2016).
Fernandez-Bravo, A., Yao, K., Barnard, E. S., Borys, N. J., Levy, E. S., Tian, B., Tajon, C. A., Moretti, L., Altoe, M. V., Aloni, S., Beketayev, K., Scotognella, F., Cohen, B. E., Chan, E. M. & Schuck, P. J. Continuous-wave upconverting nanoparticle microlasers. Nat. Nanotechnol. 13, 572-577 (2018).
Si, X., Li, Z., Qu-Quan, W., Hong, D. & Shi-He, Y. Energy Transfer and Avalanche Upconversion of Nd x Y 1- x VO 4 Nanocrystals. Chin. Phys. Lett. 26, 124209 (2009).
Bednarkiewicz, A. & Strek, W. Laser-induced hot emission in Nd3 /Yb3: YAG nanocrystallite ceramics. J. Phys. D: Appl. Phys. 35, 2503-2507 (2002).
Dwivedi, Y., Bahadur, A. & Rai, S. B. Optical avalanche in Ho:Yb:Gd2O3 nanocrystals. J. Appl. Phys. 110, 043103 (2011).
Wang, G., Peng, Q. & Li, Y. Luminescence Tuning of Upconversion Nanocrystals. Chemistry—A European Journal 16, 4923-4931 (2010).
Zhou, B., Shi, B., Jin, D. & Liu, X. Controlling upconversion nanocrystals for emerging applications. Nat. Nanotechnol. 10, 924-936 (2015).
Tian, B., Fernandez-Bravo, A., Najafiaghdam, H., Torquato, N. A., Altoe, M. V. P., Teitelboim, A., Tajon, C. A., Tian, Y., Borys, N. J., Barnard, E. S., Anwar, M., Chan, E. M., Schuck, P. J. & Cohen, B. E. Low irradiance multiphoton imaging with alloyed lanthanide nanocrystals. Nat. Commun. 9, 3082 (2018).
Tajon, C. A., Yang, H., Tian, B., Tian, Y., Ercius, P., Schuck, P. J., Chan, E. M. & Cohen B. E. Photostable and efficient upconverting nanocrystal-based chemical sensors. Optical Materials 84, 345-353 (2018).
Bünzli, J.-C. G. & Piguet, C. Taking advantage of luminescent lanthanide ions. Chem. Soc. Rev. 34, 1048-1077 (2005).
Gnach, A., Lipinski, T., Bednarkiewicz, A., Rybka, J. & Capobianco, J. A. Upconverting nanoparticles: assessing the toxicity. Chem. Soc. Rev. 44, 1561-1584 (2015).
Gargas, D. J., Chan, E. M., Ostrowski, A. D., Aloni, S., Altoe, M. V. P., Barnard, E. S., Sanii, B., Urban, J. J., Milliron, D. J., Cohen, B. E. & Schuck, P. J. Engineering bright sub-10-nm upconverting nanocrystals for single-molecule imaging. Nat. Nanotechnol. 9, 300 (2014).
Fischer, S., Bronstein, N. D., Swabeck, J. K., Chan, E. M. & Alivisatos, A. P. Precise Tuning of Surface Quenching for Luminescence Enhancement in Core-Shell Lanthanide-Doped Nanocrystals. Nano Lett. 16, 7241-7247 (2016).
Johnson, N. J. J., He, S., Diao, S., Chan, E. M., Dai, H. & Almutairi, A. Direct Evidence for Coupled Surface and Concentration Quenching Dynamics in Lanthanide-Doped Nanocrystals. Journal of the American Chemical Society 139, 3275-3282 (2017).
Liu, Q., Zhang, Y., Peng, C. S., Yang, T., Joubert, L.-M. & Chu, S. Single upconversion nanoparticle imaging at sub-10 W cm-2 irradiance. Nat. Photonics 12, 548-553 (2018).
Chen, X., Jin, L., Kong, W., Sun, T., Zhang, W., Liu, X., Fan, J., Yu, S. F. & Wang, F. Confining energy migration in upconversion nanoparticles towards deep ultraviolet lasing. Nat. Commun. 7, 10304 (2016).
Wang, F., Deng, R., Wang, J., Wang, Q., Han, Y., Zhu, H., Chen, X. & Liu, X. Tuning upconversion through energy migration in core-shell nanoparticles. Nat. Mater. 10, 968- 973 (2011).

(56) References Cited

OTHER PUBLICATIONS

Gamelin, D. R., Lüthi, S. R. & Güdel, H. U. The Role of Laser Heating in the Intrinsic Optical Bistability of Yb3+-Doped Bromide Lattices. The Journal of Physical Chemistry B 104, 11045-11057 (2000).

Butcher, J. C. Numerical Methods for Ordinary Differential Equations. (Wiley, 2016).

Goldner, P. & Pelle, F. Photon avalanche fluorescence and lasers. Optical Materials 5, 239-249 (1996).

Joubert, M. F., Guy, S. & Jacquier, B. Model of the photon-avalanche effect. Phys. Rev. B 48, 10031-10037 (1993).

Hong, G., Diao, S., Chang, J., Antaris, A. L., Chen, C., Zhang, B., Zhao, S., Atochin, D. N., Huang, P. L., Andreasson, K. I., Kuo, C. J. & Dai, H. Through-skull fluorescence imaging of the brain in a new near-infrared window. Nat. Photonics 8, 723-730 (2014).

Ostrowski, A. D., Chan, E. M., Gargas, D. J., Katz, E. M., Han, G., Schuck, P. J., Milliron, D. J. & Cohen, B. E. Controlled Synthesis and Single-Particle Imaging of Bright, Sub-10 nm Lanthanide-Doped Upconverting Nanocrystals. ACS Nano 6, 2686-2692 (2012).

Hossan, M. Y., Hor, A., Luu, Q., Smith, S. J., May, P. S. & Berry, M. T. Explaining the Nanoscale Effect in the Upconversion Dynamics of β-NaYF4:Yb3+, Er3+ Core and Core-Shell Nanocrystals. The Journal of Physical Chemistry C 121, 16592-16606 (2017).

Teitelboim, A., Tian, B., Garfield, D. J., Fernandez-Bravo, A., Gotlin, A. C., Schuck, P. J., Cohen, B. E. & Chan, E. M. Energy Transfer Networks within Upconverting Nanoparticles Are Complex Systems with Collective, Robust, and History-Dependent Dynamics. The Journal of Physical Chemistry C 123, 2678-2689 (2019).

Chan, E. M., Gargas, D. J., Schuck, P. J. & Milliron, D. J. Concentrating and Recycling Energy in Lanthanide Codopants for Efficient and Spectrally Pure Emission: The Case of NaYF4:Er3+/Tm3+ Upconverting Nanocrystals. The Journal of Physical Chemistry B 116, 10561-10570 (2012).

Corle, T. R. & Kino, G. S. Confocal Scanning Optical Microscopy and Related Imaging Systems. (Academic Press, 1996).

Chen, C., Wang, F., Wen, S., Su, Q. P., Wu, M. C. L., Liu, Y., Wang, B., Li, D., Shan, X., Kianinia, M., Aharonovich, I., Toth, M., Jackson, S. P., Xi, P. & Jin, D. Multi-photon near- infrared emission saturation nanoscopy using upconversion nanoparticles. Nat. Commun. 9, 3290 (2018).

Pichaandi, J., Boyer, J.-C., Delaney, K. R. & van Veggel, F. C. J. M. Two-Photon Upconversion Laser (Scanning and Wide-Field) Microscopy Using Ln3+-Doped NaYF4 Upconverting Nanocrystals: A Critical Evaluation of their Performance and Potential in Bioimaging. The Journal of Physical Chemistry C 115, 19054-19064 (2011).

Auzel, F., Chen, Y. & Meichenin, D. Room temperature photon avalanche up-conversion in Er-doped ZBLAN glass. J. Lumin. 60-61, 692-694 (1994).

Auzel, F. & Chen, Y. Photon avalanche luminescence of Er3+ ions in LiYF4 crystal. J. Lumin. 65, 45-56 (1995).

Gomes, A. S. L., Maciel, G. S., de Araújo, R. E., Acioli, L. H. & de Araújo, C. B. Diode pumped avalanche upconversion in Pr3+-doped fibers. Optics Communications 103, 361-364 (1993).

Martín, I. R., Rodríguez, V. D., Guyot, Y., Guy, S., Boulon, G. & Joubert, M. F. Room temperature photon avalanche upconversion in Tm3+-doped fluoroindate glasses. J. Phys.: Condens. Matter 12, 1507-1516 (2000).

Li, Y., Wang, T., Ren, W., Han, J., Yin, Z., Qiu, J., Yang, Z. & Song, Z. BiOCI:Er3+ Nanosheets with Tunable Thickness for Photon Avalanche Phosphors. ACS Applied Nano Materials 2, 7652-7660 (2019).

Garfield, D. J., Borys, N. J., Hamed, S. M., Torquato, N. A., Tajon, C. A., Tian, B., Shevitski, B., Barnard, E. S., Suh, Y. D., Aloni, S., Neaton, J. B., Chan, E. M., Cohen, B.E. & Schuck, P. J. Enrichment of molecular antenna triplets amplifies upconverting nanoparticle emission. Nat. Photonics 12, 402-407 (2018).

Chan, E. M. Controlled Assembly of Upconverting Nanoparticles for Low-Threshold Microlasers and Their Imaging in Scattering Media. ACS Nano 14, 1508-1519 (2020).

Fernandez-Bravo, A., Wang, D., Barnard, E. S., Teitelboim, A., Tajon, C., Guan, J., Schatz, G. C., Cohen, B. E., Chan, E. M., Schuck, P. J. & Odom, T. W. Ultralow-threshold, continuous-wave upconverting lasing from subwavelength plasmons. Nat. Mater. 18, 1172-1176 (2019).

Kilbane, J. D., Chan, E. M., Monachon, C., Borys, N. J., Levy, E. S., Pickel, A. D., Urban, J. J., Schuck, P. J. & Dames, C. Far-field optical nanothermometry using individual sub-50 nm upconverting nanoparticles. Nanoscale 8, 11611-11616 (2016).

Zhai, Y., Zhou, Y., Yang, X., Wang, F., Ye, W., Zhu, X., She, D., Lu, W. D. & Han, S.-T. Near infrared neuromorphic computing via upconversion-mediated optogenetics. Nano Energy 67, 104262 (2020).

Bradac, C., Johnsson, M. T., Breugel, M. v., Baragiola, B. Q., Martin, R., Juan, M. L., Brennen, G. K. & Volz, T. Room-temperature spontaneous superradiance from single diamond nanocrystals. Nat. Commun. 8, 1205 (2017).

Asenjo-Garcia, A., Kimble, H. J. & Chang, D. E. Optical waveguiding by atomic entanglement in multilevel atom arrays. Proceedings of the National Academy of Sciences 116, 25503 (2019).

Joubert, M.-F., Guy, S., Jacquier, B. & Linares, C. The photon-avalanche effect: review, model and application. Optical Materials 4, 43-49 (1994).

Guy, S., Joubert, M. & Jacquier, B. Photon avalanche and the mean-field approximation. Physical Review B 55, 8240 (1997).

Villanueva-Delgado, P., Biner, D. & Krämer, K. Judd-Ofelt analysis of β-NaGdF4: Yb3+, Tm3+ and β-NaGdF4: Er3+ single crystals. Journal of luminescence 189, 84-90 (2017).

Carnall, W., Crosswhite, H. & Crosswhite, H. M. Energy level structure and transition probabilities in the spectra of the trivalent lanthanides in $LaF_3$. (Argonne National Lab.(ANL), Argonne, IL (United States), 1978).

Armagan, G., Buoncristiani, A. & Di Bartolo, B. Excited state dynamics of thulium ions in Yttrium Aluminum Garnets. Optical Materials 1, 11-20 (1992).

Shaw, L., Chang, R. & Djeu, N. Measurement of up-conversion energy-transfer probabilities in Ho: Y 3 Al 5 O 12 and Tm: Y 3 Al 5 O 12. Physical Review B 50, 6609 (1994).

Basiev, T., Orlovskii, Y. V., Pukhov, K. & Auzel, F. Multiphonon relaxation of the energy of electronic excitation in optical crystals doped with rare-earth ions. Laser Physics 7, 1139-1152 (1997).

Miyakawa, T. & Dexter, D. Phonon sidebands, multiphonon relaxation of excited states, and phonon-assisted energy transfer between ions in solids. Physical Review B 1, 2961 (1970).

Fischer, S., Bronstein, N. D., Swabeck, J. K., Chan, E. M. & Alivisatos, A. P. Precise tuning of surface quenching for luminescence enhancement in core-shell lanthanide-doped nanocrystals. Nano letters 16, 7241-7247 (2016).

Peterka, P., Kasik, I., Dhar, A., Dussardier, B. & Blanc, W. Theoretical modeling of fiber laser at 810 nm based on thulium-doped silica fibers with enhanced 3 H 4 level lifetime. Optics express 19, 2773-2781 (2011).

Auzel, F. & Pellé, F. Bottleneck in multiphonon nonradiative transitions. Physical Review B 55, 11006 (1997).

Chan, E. M. Combinatorial approaches for developing upconverting nanomaterials: high-throughput screening, modeling, and applications. Chem. Soc. Rev. 44, 1653-1679, doi:10.1039/C4CS00205A (2015).

Jackson, S. D. & King, T. A. Theoretical modeling of Tm-doped silica fiber lasers. Journal of lightwave technology 17, 948 (1999).

Deng, H. et al. Additive-mediated splitting of lanthanide orthovanadate nanocrystals in water: morphological evolution from rods to sheaves and to spherulites. Crystal Growth and Design 8, 4432-4439 (2008).

Joshi, C. & Rai, S. Structural, thermal, and optical properties of Pr3+/Yb3+ co-doped oxyhalide tellurite glasses and its nano-crystalline parts. Solid state sciences 14, 997-1003 (2012).

Joshi, C., Rai, R. & Rai, S. Structural, thermal, and optical properties of Er3+/Yb3+ co-doped oxyhalide tellurite glasses, glass-ceramics and ceramics. Journal of Quantitative Spectroscopy and Radiative Transfer 113, 397-404 (2012).

Babu, P. et al. Photon avalanche upconversion in Ho3+—Yb3+ co-doped transparent oxyfluoride glass-ceramics. Chemical Physics Letters 600, 34-37 (2014).

(56) References Cited

OTHER PUBLICATIONS

Marciniak, L., Stefanski, M., Tomala, R., Hreniak, D. & Strek, W. Synthesis and up-conversion luminescence of Er3+ and Y b3+ codoped nanocrystalline tetra-(KLaP4012) and pentaphosphates (LaP5O14). The Journal of Chemical Physics 143, 094701 (2015).
Rathaiah, M. et al. Photon avalanche upconversion in Ho3+-doped gallium nano-garnets. Optical Materials 39, 16-20 (2015).
Wang, F., Yang, B., Yu, Q., Liu, D. & Ma, W. Cooperative upconversion luminescence of Er3+ in Gd2O3—xSx phosphor. Spectrochimica Acta Part A: Molecular and Biomolecular Spectroscopy 190, 312-317 (2018).
Plöschner, M. et al. Simultaneous super-linear excitation-emission and emission depletion allows imaging of upconversion nanoparticles with higher sub-diffraction resolution. Optics Express 28, 24308-24326 (2020).
Liu, B. et al. Upconversion nonlinear structured illumination microscopy. Nano Letters (2020).
Schermelleh, L. et al. Super-resolution microscopy demystified. Nature cell biology 21, 72-84 (2019).
De Luca, G. M. et al. Re-scan confocal microscopy: scanning twice for better resolution. Biomedical optics express 4, 2644-2656 (2013).
Juette, M. F. et al. Three-dimensional sub-100 nm resolution fluorescence microscopy of thick samples. Nature methods 5, 527-529 (2008).
Schoen, I., Ries, J., Klotzsch, E., Ewers, H. & Vogel, V. Binding-activated localization microscopy of DNA structures. Nano letters 11, 4008-4011 (2011).
Szczurek, A. et al. Imaging chromatin nanostructure with binding-activated localization microscopy based on DNA structure fluctuations. Nucleic acids research 45, e56-e56 (2017).
York, A. G. et al. Instant super-resolution imaging in live cells and embryos via analog image processing. Nature methods 10, 1122-1126 (2013).
Demmerle, J. et al. Strategic and practical guidelines for successful structured illumination microscopy. Nature protocols 12, 988-1010 (2017).
Gustafsson, M. G. et al. Three-dimensional resolution doubling in wide-field fluorescence microscopy by structured illumination. Biophysical journal 94, 4957-4970 (2008).
Sheppard, C. J., Mehta, S. B. & Heintzmann, R. Superresolution by image scanning microscopy using pixel reassignment. Optics letters 38, 2889-2892 (2013).
Eggeling, C., Willig, K. I., Sahl, S. J. & Hell, S. W. Lens-based fluorescence nanoscopy. Quarterly reviews of biophysics 48, 178-243 (2015).
Huff, J., et al. The Airyscan detector from ZEISS: confocal imaging with improved signal-to-noise ratio and super-resolution. Nature methods 12, i-ii (2015).
Jungmann, R. et al. Quantitative super-resolution imaging with qPAINT. Nature methods 13, 439-442 (2016).
Schnitzbauer, J., Strauss, M. T., Schlichthaerle, T., Schueder, F. & Jungmann, R. Super-resolution microscopy with DNA-PAINT. Nature protocols 12, 1198 (2017).
Dertinger, T., Colyer, R., Iyer, G., Weiss, S. & Enderlein, J. Fast, background-free, 3D super-resolution optical fluctuation imaging (SOFI). Proceedings of the National Academy of Sciences 106, 22287-22292 (2009).
Gustafsson, N. et al. Fast live-cell conventional fluorophore nanoscopy with ImageJ through super-resolution radial fluctuations. Nature communications 7, 1-9 (2016).
Chen, B.-C. et al. Lattice light-sheet microscopy: imaging molecules to embryos at high spatiotemporal resolution. Science 346 (2014).
Chang, J.-B. et al. Iterative expansion microscopy. Nature methods 14, 593-599 (2017).
Chen, F., Tillberg, P. W. & Boyden, E. S. Expansion microscopy. Science 347, 543-548 (2015).
Liu, W. et al. Breaking the Axial Diffraction Limit: A Guide to Axial Super-Resolution Fluorescence Microscopy. Laser & Photonics Reviews 12, 1700333 (2018).

* cited by examiner

8% Tm
Green
Gray
s = 20.8
s = 26.0
s = 22.2
core/shell size
○ 10/4.0 nm
x 17/5.6 nm
∘ 16/8.5 nm
Red
Purple
s = 26.0
s = 31.6
s = 15.5
X 8% Tm
△ 20% Tm
+ 100% Tm
Emission intensity (a.u.)
Excitation intensity (kW cm-2)

Green
Red
Purple
Threshold (kW cm-2)
Relaxation rate, W2 (seconds-1)
Model, 8% Tm
Model, 20% Tm
Model, 100% Tm Green
Red
Blue
4%
8%
20%
Quantum yield (%)
Brightness (a.u.)
Excitation intensity (kW cm-2)

9.9 kW/cm²
217±18 nm
216±19 nm
Blue
Orange 7.1 kW/cm²
Photon localization accuracy < 2nm
81 ± 9 nm
65 ± 7 nm Normalized intensity
x (nm)

PASSI simulation
Experiment
FWHM (nm)
Excitation Intensity (kW/cm²)

13.8 (kW/cm²)
10.9 (kW/cm²)
9.9 (kW/cm²)
8.9 (kW/cm²)
7.6 (kW/cm²)
Green
Red 500 nm

1000

CW: continuous wave
SP: short pass
LP: long pass
TCSPC: time-correlated single photon counting
APD: avalanche photon diode

SYSTEM AND METHOD FOR PROVIDING AND/OR FACILITATING GIANT NONLINEAR OPTICAL RESPONSES FROM PHOTON AVALANCHING NANOPARTICLES

CROSS-REFERENCE TO RELATED APPLICATION(S)

This application relates to and claims priority from U.S. Patent Application No. 63/116,216, filed on Nov. 20, 2020, the entire disclosure of which is incorporated herein by reference.

STATEMENT REGARDING FEDERALLY SPONSORED RESEARCH

This invention was made with government support under Grant Nos. DE-SC0019443, and DE-AC02-05CH11231, awarded by the U.S. Department of Energy. The government has certain rights in the invention.

FIELD OF THE DISCLOSURE

The present disclosure relates generally to nanoparticles, and more specifically, to exemplary embodiments of systems and method for providing and/or facilitating exemplary giant nonlinear optical responses from photon avalanching nanoparticles.

BACKGROUND INFORMATION

One of several advantages of the use of photon avalanching (PA) can be its combination of extreme nonlinearity and efficiency, which can be achieved without any periodic structuring or interference effects. PA was first observed over 40 years ago in $Pr^{3+}$-doped bulk crystals, which exhibited a sudden increase in upconverted luminescence when excited beyond a critical pump $I_P$). (See, e.g., Reference 3). Its discovery led to the development of other lanthanide-based bulk PA materials, utilized for example in efficient upconverted lasers (see, e.g., References 4-6 and 16), and its unique properties continue to spark interest over diverse fields. (See, e.g., References 6 and 7).

Thus, it may be beneficial to provide exemplary giant nonlinear optical responses from photon avalanching nanoparticles which can overcome at least some of the deficiencies described herein above.

SUMMARY OF EXEMPLARY EMBODIMENTS

To that end, exemplary nanoparticle and method for inducing photon avalanching using a nanoparticle can be provided. The nanoparticle can include, for example, at least 99% thulium doped nanocrystals of the nanoparticle. An atomic concentration of the thulium can be at least 8%. A near infrared excitation wavelength of the nanocrystals can be greater than about 1064 nm. The near infrared excitation wavelength can be between about 1400 nm to about 1490 nm. A passivated shell(s) can be included which can surround the nanocrystals.

A passivated shell(s) can be included which can surround the nanocrystals. For example, a $Yb^{3+}$ sensitizer can be omitted from the nanoparticle.

Additionally, an exemplary nanoparticle for inducing photon avalanching can include a plurality of nanocrystals, where a combined size of the nanocrystals can be less than about 100 nanometers in three-dimensional space. A near infrared excitation wavelength of the nanocrystals can be greater than about 1064 nm. The near infrared excitation wavelength can be between about 1400 nm to about 1490 nm. A passivated shell(s) can be included, which can surround the nanocrystals.

These and other objects, features and advantages of the exemplary embodiments of the present disclosure will become apparent upon reading the following detailed description of the exemplary embodiments of the present disclosure, when taken in conjunction with the appended paragraphs.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 5 is a set of exemplary transmission electron micrographs of $NaYF_4$ 1%-100% $Tm^3$ according to an exemplary embodiment of the present disclosure;

FIG. 6 is a set of exemplary transmission electron micrographs of $NaYF_4$ 1%-20% $Tm^3$ according to an exemplary embodiment of the present disclosure;

FIG. 18 is an illustration of an exemplary block diagram of an exemplary system in accordance with certain exemplary embodiments of the present disclosure.

Figures 1A, 1B, 1C:
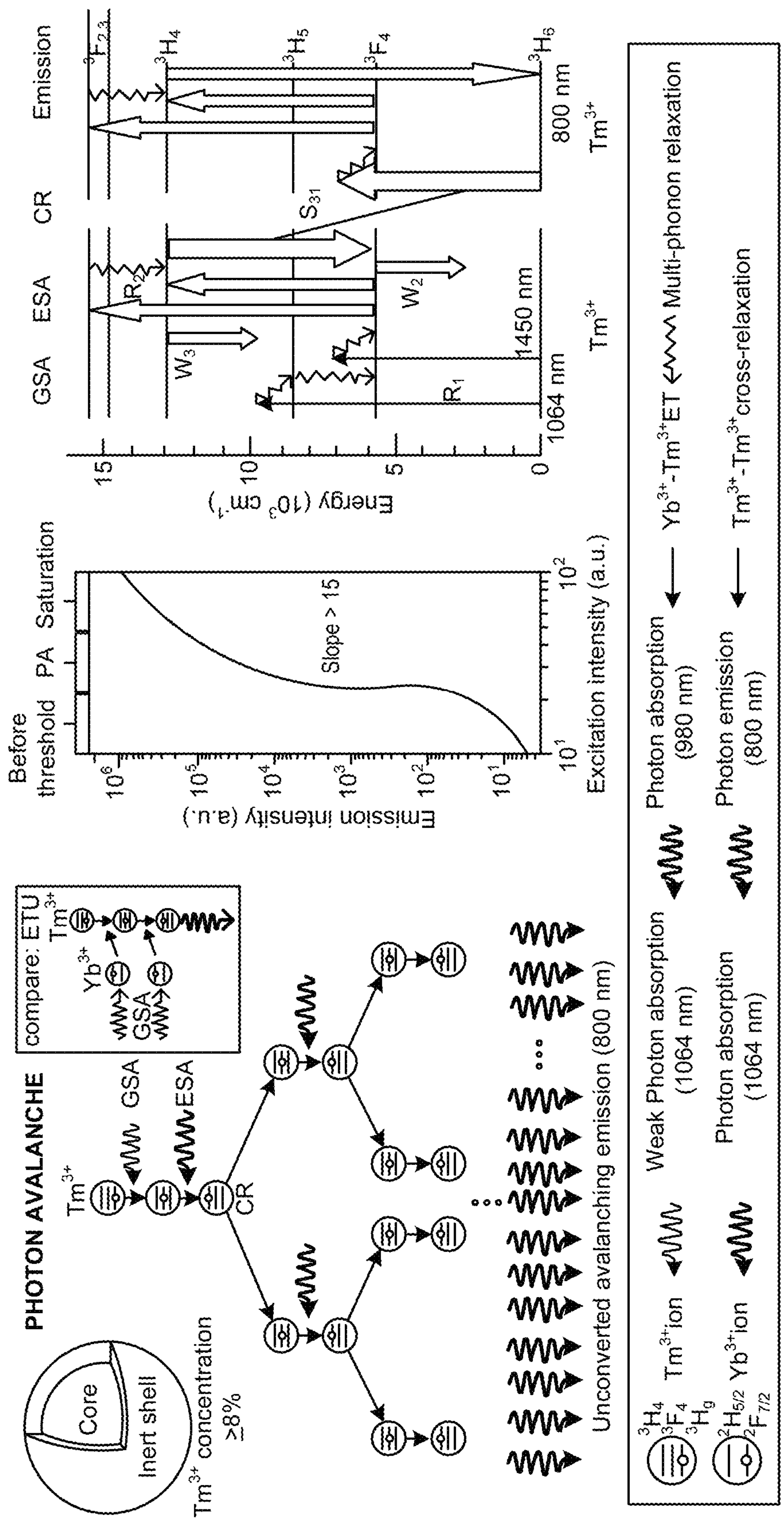
FIG. 1A is a set of exemplary diagrams illustrating core/shell avalanche nanoparticles ("ANPs"), with avalanching occurring when core $Tm^{3+}$ concentration is ≥8% according to an exemplary embodiment of the present disclosure.
FIG. 1B is an exemplary graph illustrating emission intensity vs. excitation intensity according to an exemplary embodiment of the present disclosure.
FIG. 1C is an exemplary diagram of energy levels of the $4f^{12}$ manifolds of $Tm^{3+}$. $R_1$, $R_2$=ground- and excited-state excitation rates according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

Photon avalanching can be a positive feedback system or method (see, e.g., Reference 6) that can be analogous to the second order phase transition of ferromagnetic spin systems, comparisons that have proven useful for modeling the process. (See, e.g., References 5 and 17). In lanthanide-based PA, a single ground-state absorption ("GSA") event initiates a chain reaction of excited-state absorption ("ESA") and cross-relaxation events between lanthanide ("$Ln^{3+}$") ions, resulting in the emission of many upconverted photons. (See e.g., FIG. 1A). The sensitivity of $Ln^{3+}$ photophysics to local material properties has precluded the realization of PA in nanomaterials. Avalanche-like behavior in previous nanoparticle designs was ultimately the result of the formation of larger aggregate materials (see, e.g., Reference 18), non-PA thermal mechanisms (see, e.g., References 19 and 20), or of pre-avalanche energy-looping ("EL") (see, e.g., References 6, 11, 13, and 21-27), with nonlinear order s ranging from 2-7 (e.g., s can be defined by $I_E=I_P^s$ where $I_E$ can be emission intensity). (See, e.g., References 7, 11, and 22). There remains strong motivation for developing PA in nanoparticles, as the ability to process these colloidal nanomaterials in solution facilitates them to be incorporated into varied device platforms, novel nanotechnologies, and unique environments (see, e.g., References 23 ad 28), using biocompatible surface chemistries (see, e.g., References 28-32). FIGS. 1A-1C show exemplary illustrations of photon avalanching mechanism in $Tm^{3+}$-doped nanocrystals accordingly to an exemplary embodiment of the present disclosure. In particular, FIG. 1A illustrates an exemplary diagram of core/shell ANPs, with avalanching occurring when core $Tm^{3+}$ concentration is ≥approximately 8% accordingly to an exemplary embodiment of the present disclosure. This exemplary embodiment indicates an exemplary ETU process, in which $Yb^{3+}$ ions sensitize ground state absorption, precluding PA. FIG. 1B shows an exemplary model plot of emission intensity vs. excitation intensity, indicating the three (3) stages of PA behavior accordingly to exemplary embodiment of the present disclosure. FIG. 1C provides an exemplary illustration of exemplary energy levels of the 4f manifolds of $Tm^{3+}$ according to an exemplary embodiment of the present disclosure. In this exemplary embodiment, $R_1$, $R_2$=ground- and excited-state excitation rates, respectively. $W_2$, $W_3$ can be the aggregate rates of relaxation from the $^3F_4$ and $^3H_4$ levels, respectively. These exemplary rates account for radiative and nonradiative relaxation pathways but may exclude cross-relaxation (CR) and other energy transfer processes. Additionally, in this exemplary embodiment, $s_{31}$ can equal or be substantially a CR rate.

Exemplary nanocrystal design can be based on: 1) a design paradigm for upconverting nanoparticles ("UCNPs") emphasizing high $Ln^{3+}$ content and energy confinement (see, e.g., References 23, 29, and 33-37; 2) the choice of $Tm^{3+}$ (see, e.g., FIG. 1A), with its slow intermediate-state decay rate $W_2$; 3) compositions that can omit sensitizers (see, e.g., Reference 22) (see, e.g., $Yb^{3+}$ in FIG. 1); and 4) the selection of NIR-II excitation wavelengths (e.g., either 1064 nm plus or minus about 10% or 1450 nm plus or minus about 10%; see FIGS. 1A-1C) optimized for resonant ESA, in contrast to the usual $Tm^{3+}$ ground state pumping wavelengths (e.g., 800 nm, or 980 nm with $Yb^{3+}$ sensitization; shown in FIGS. 1A-1C). (See, e.g., Reference 6, 11, 12, 21, and 38). These design specifications led to the synthesis of $Tm^{3+}$-doped β-$NaYF_4$ core/shell structures 16-33 nm in total diameter (see, e.g., Reference 29 and 33) (see FIGS. 5 and 6; and Tables 1 and 2), which can be excited in the NIR-II region and emit in the NIR-I region at 800 nm. (See, e.g., Reference 22). The exemplary nanocrystals can have a combined size that can be less than about 100 nanometers in three-dimensional space (plus or minus about 10%).

FIG. 5 shows a set of exemplary transmission electron micrographs of representative $NaYF_4$: 1%-100% $Tm^{3+}$@$NaY_{0.8}Gd_{0.2}F_4$ core-shell nanocrystals according to an exemplary embodiment of the present disclosure. Exemplary sizing details are provided in Tables 1 and 2. Scale bar=20 nm. FIG. 6 illustrates a set of exemplary transmission electron micrographs of representative $NaYF_4$:1%-20% $Tm^{3+}$ cores, indicating that some of the cores are prolate in shape according to an exemplary embodiment of the present disclosure. In this example, the scale bar=about 20 nm.

To determine whether PA occurs, three definitive criteria were analyzed (see, e.g., References 5 and 6): (i) stronger pump-laser-induced ESA compared to GSA, with the ratio of ESA to GSA rates exceeding $10^4$ ($R_2/R_1$ shown in FIG. 1C) (see, e.g., Reference 22); (ii) a clear excitation power threshold, above which a large nonlinear increase in excited state population and emission can be observed; and (iii) a slowdown of the excited-state population rise-time at threshold. For PA, rise times can typically reach >100× the lifetime of the intermediate state, up to seconds. (See, e.g., Reference 6). Together, these criteria delineate PA from other nonlinear multiphoton processes, including conventional energy transfer upconversion (see, e.g., ETU, FIG. 1A inset) and energy looping. (See, e.g., Reference 22).

Plots of $Tm^{3+}$ emission at 800 nm versus 1064 nm pump intensity measured on nanoparticle ensembles drop-casted onto glass substrates show that as $Tm^{3+}$ content can be increased from 1% to 4%, the degree of nonlinearity s also increases, but resides firmly in the energy looping regime, with s≤7. (See, e.g., FIG. 2A). At these $Tm^{3+}$ concentrations, the chain reaction of ESA and cross-relaxation can be too slow to compensate for radiative and multiphoton relaxation from the $^3F_4$ intermediate state, which occurs with rate $W_2$. However, at 8% $Tm^{3+}$ doping, a clear threshold can be observed at pump intensity of ca. 20 kW $cm^{-2}$ (e.g., FIG. 7, Table 3), beyond which the combination of cross-relaxation and ESA act as a gain, and a nonlinear slope s >22 can be achieved (see, e.g., FIG. 2A, green circles), surpassing the maximum value of 7 observed in the existing pre-avalanching systems. Up- and down-scans of excitation intensity display no measurable photobleaching nor hysteresis, thus showing no significant contribution from excitation-induced thermal avalanching. (See e.g., FIG. 8). (See, e.g., Reference 39). Critically, all three PA criteria can be met at room temperature for these 8% $Tm^{3+}$ ANPs. (See e.g., FIG. 2). FIG. 8 illustrates an exemplary graph showing increasing and decreasing excitation power scans for 8% $Tm^{3+}$ doped nanocrystals according to an exemplary embodiment of the present disclosure. Hysteresis is not observed while scanning up and then down. 800 nm emission intensity vs. excitation intensity can be measured under 1064 nm excitation.

Figures 2A, 2B:
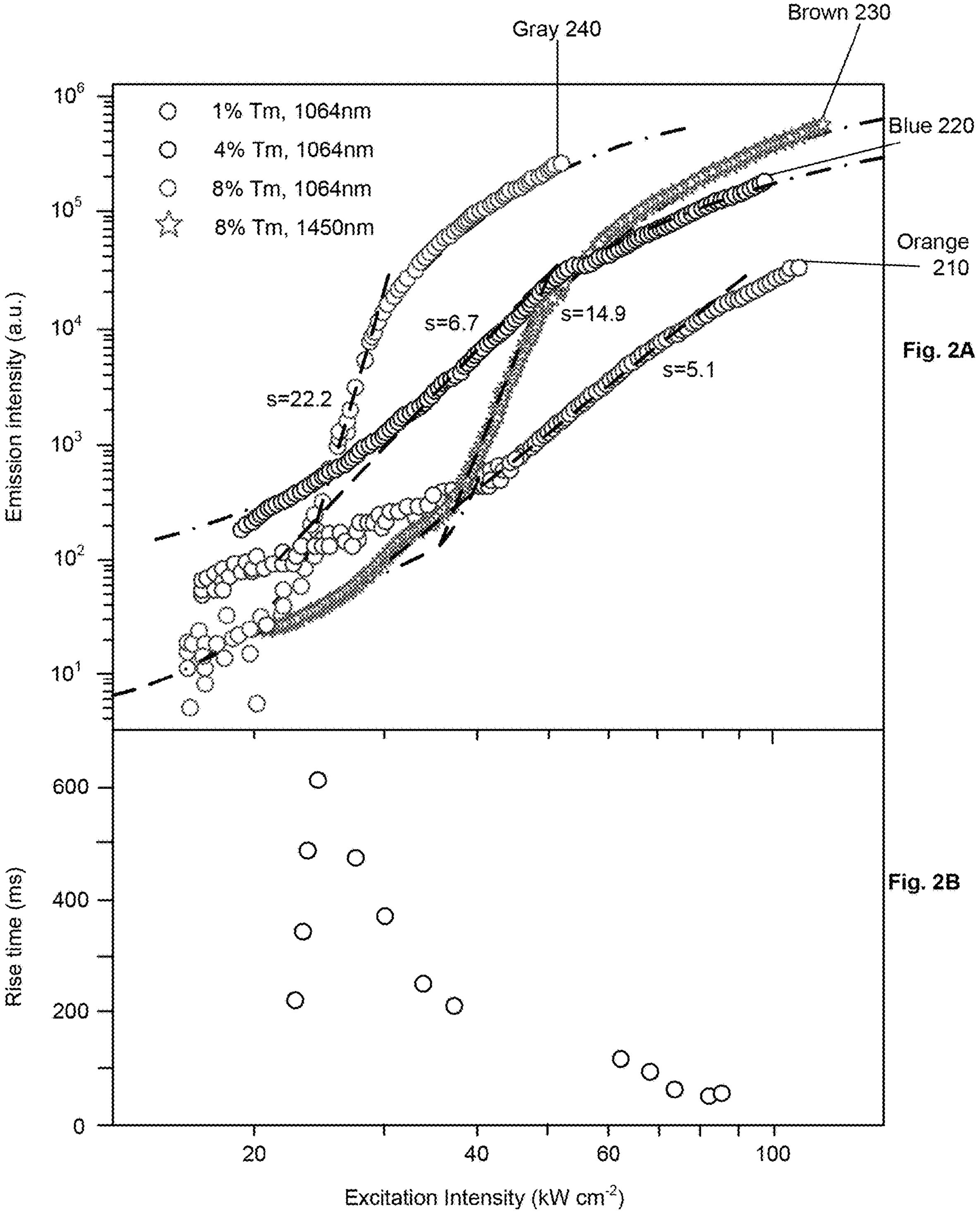
FIG. 2A is an exemplary graph illustrating 800 nm emission intensity vs. excitation intensity for ensemble films of 1%, 4%, and 8% $Tm^{3+}$-doped nanocrystals according to an exemplary embodiment of the present disclosure.
FIG. 2B is an exemplary graph illustrating 800 nm emission rise times vs. excitation intensity for 8% $Tm^{3+}$ ANPs according to an exemplary embodiment of the present disclosure.

FIGS. 2A and 2B illustrate exemplary graphs providing an exemplary demonstration of nanoparticle photon avalanching according to an exemplary embodiment of the present disclosure. In particular, FIG. 2A illustrates an exemplary graph displaying about 800 nm emission intensity vs. excitation intensity for ensemble films of about 1% (orange 210), 4%, (blue 220) and 8% (brown 230) $Tm^{3+}$-doped nanocrystals according to an exemplary embodiment of the present disclosure. In this exemplary embodiment, 1064 nm excitation is used, except where noted. (See, e.g., Tables 1 and 2 for ANP sizes). Photon avalanching can be achieved in the 8% $Tm^{3+}$ ANPs with 1450 nm excitation (brown stars). The dash-dotted lines can be fits of the PA DRE model to the data. FIG. 2B shows an exemplary graph displaying 800 nm emission rise times vs. excitation intensity for 8% $Tm^{3+}$ ANPs in (a), showing a large increase, up to 608 ms, near the PA threshold according to an exemplary embodiment of the present disclosure.

To understand why 8% $Tm^{3+}$ doping gives rise to such non-linear emission, the PA process in ANPs was modelled using coupled nonlinear differential rate equations. (See e.g., DREs; Tables 4-8). (See, e.g., References 17 and 40). Fitting the model to the experimental data for 8% $Tm^{3+}$ ANPs (see, e.g., FIG. 2A, grey dash-dotted line 240) yields an ESA-to-GSA rates ($R_2/R_1$) ratio of approximately 10,000 (e.g., Table 6), satisfying the $R_2/R_1>10^4$ criterion for PA. (See, e.g., References 6 and 41).

To observe the signature slow-down in excited-state population rise-times expected for PA (see, e.g., Reference 4, 6, 17 and 42), time-dependent luminescence from the $Tm^{3+3}H_4$ level (e.g., 800 nm emission) was measured. (See FIG. 2B and References 10-12). Rise time can be defined as the time needed to reach 95% of the asymptotic value. (See, e.g., FIG. 11). A significant delay of the luminescence rise-time emerges near the PA threshold intensity, reaching a maximum of approximately 608 ms (e.g., FIG. 2B)—nearly 400-fold the lifetime of the $^3F_4$ state—further verifying that the PA mechanism prevails in these nanoparticles.

Figure 10:
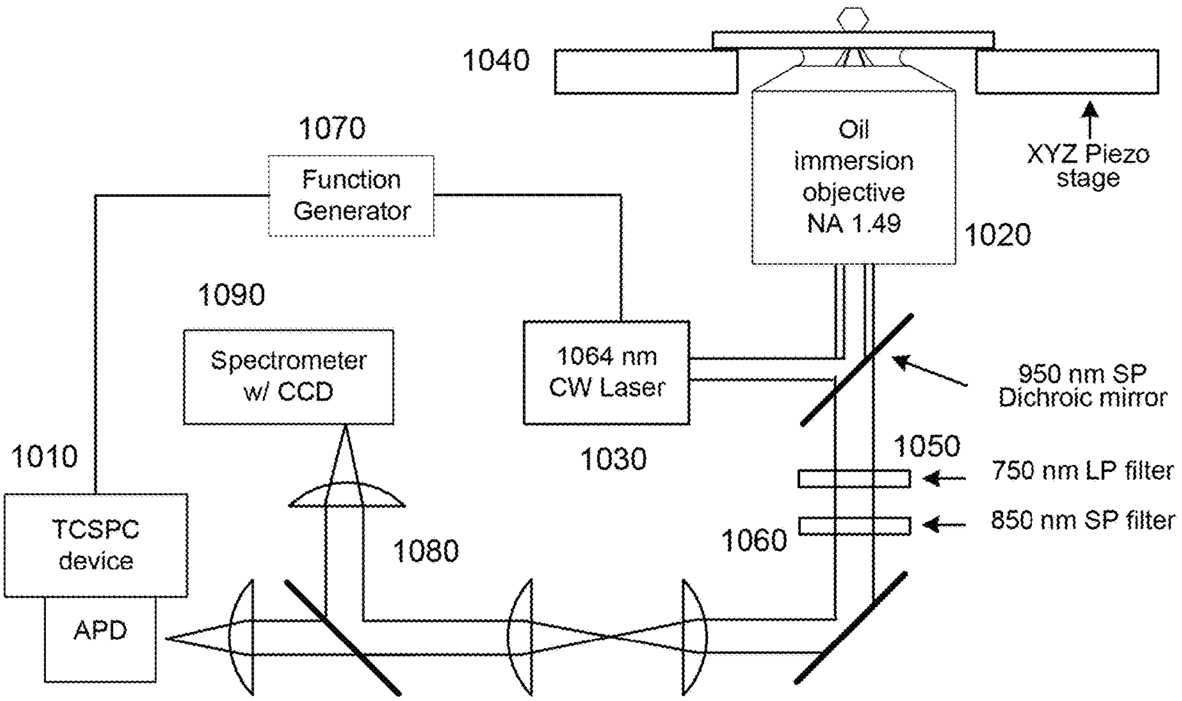
FIG. 10 is an exemplary diagram of a scanning confocal microscopy system coupled with time-correlated single photon counting electronics according to an exemplary embodiment of the present disclosure.

FIG. 10 shows an exemplary block diagram of the scanning confocal microscopy system 1000 provided with time-correlated single photon counting (TCSPC) electronics 1010, according to an exemplary embodiment of the present disclosure. The exemplary system 1000 also includes a microscope objective lens 1020 (shown as an exemplary oil immersion objective in FIG. 10), an excitation light source 1030 (shown as an exemplary laser with output wavelength 1064 nm in FIG. 10), a sample-scanning stage 1040, various exemplary wavelength specific optical filters, including shortpass (SP) filter 1050 and longpass (LP) filter 1060, a function generator 1070 for synchronizing optical excitation and collection, and exemplary optical detectors (which include single-photon detectors 1080 connected to TCSPC electronics and a charge-coupled-device (CCD) array 1090 coupled to a spectrometer, as shown in FIG. 10).

Figure 11:
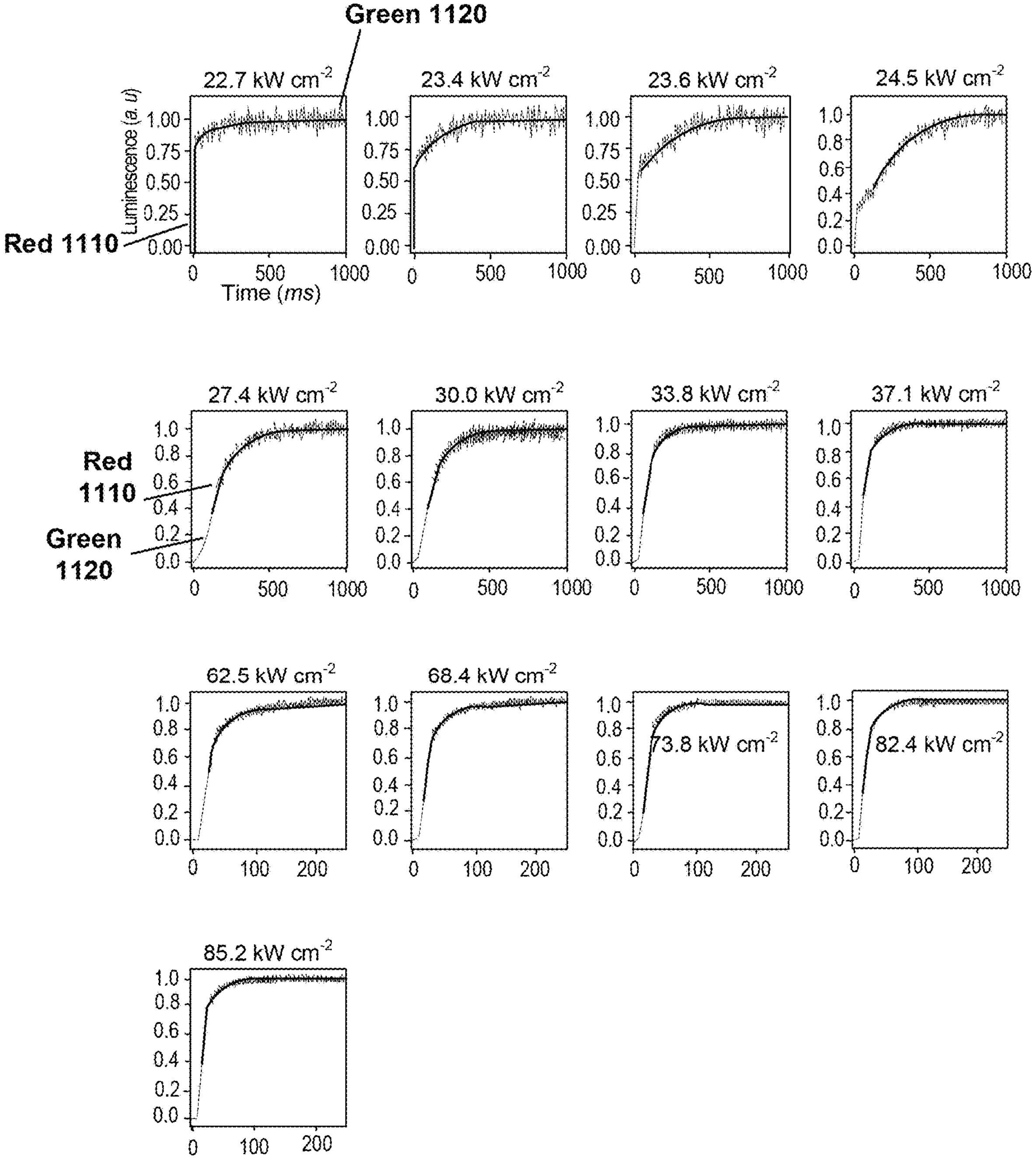
FIG. 11 is a set of exemplary graphs illustrating the evolution of time-resolved photoluminescence under 1064 nm excitation below and above the photon avalanche threshold.
Figure 12:
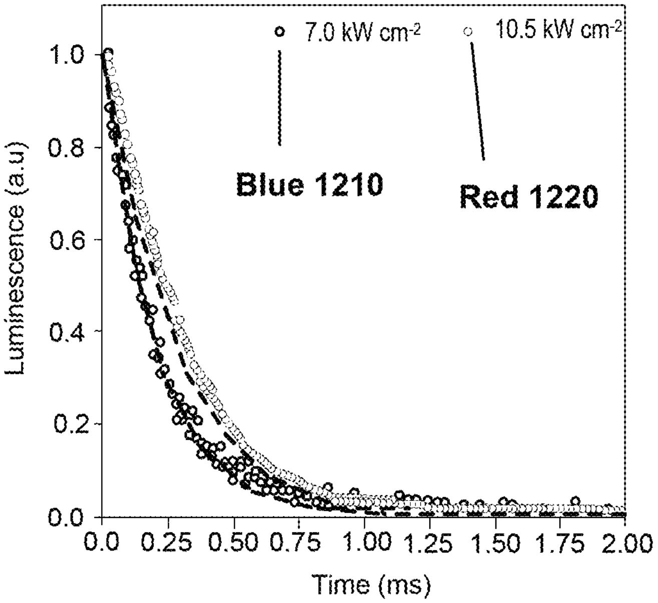
FIG. 12 is an exemplary graph illustrating a comparison of time-resolved luminescence of the $^3H_4$-$^3H_6$ transition (e.g., 800 nm) of $NaYF_4$:8% $Tm^{3+}$ nanocrystal ensembles from DRE simulations and time-resolved luminescence measurements on ensembles according to an exemplary embodiment of the present disclosure.

FIG. 11 illustrates a set of exemplary graphs showing evolution of time-resolved photoluminescence under 1064 nm excitation below and above the photon avalanche threshold according to an exemplary embodiment. The red or bright lines (1110) are exponential-fits of green lines/data points (1120). Rise time is determined by 95% of the asymptotic value. FIG. 12 shows an exemplary graph providing an exemplary comparison of time-resolved luminescence of the $^3H_4$-$^3H_6$ transition (800 nm) of $NaYF_4$:8% $Tm^{3+}$ nanocrystal ensembles from DRE simulations and time-resolved luminescence measurements on ensembles according to an exemplary embodiment. Blue dots (1210) refer to excitation intensity=about 7.0 kW cm; and Red dots (1220) refer to excitation intensity=about 10.5 kW cm'. Dashed lines are provided from the DRE simulations; and symbols are experimental data.

Figure 13:
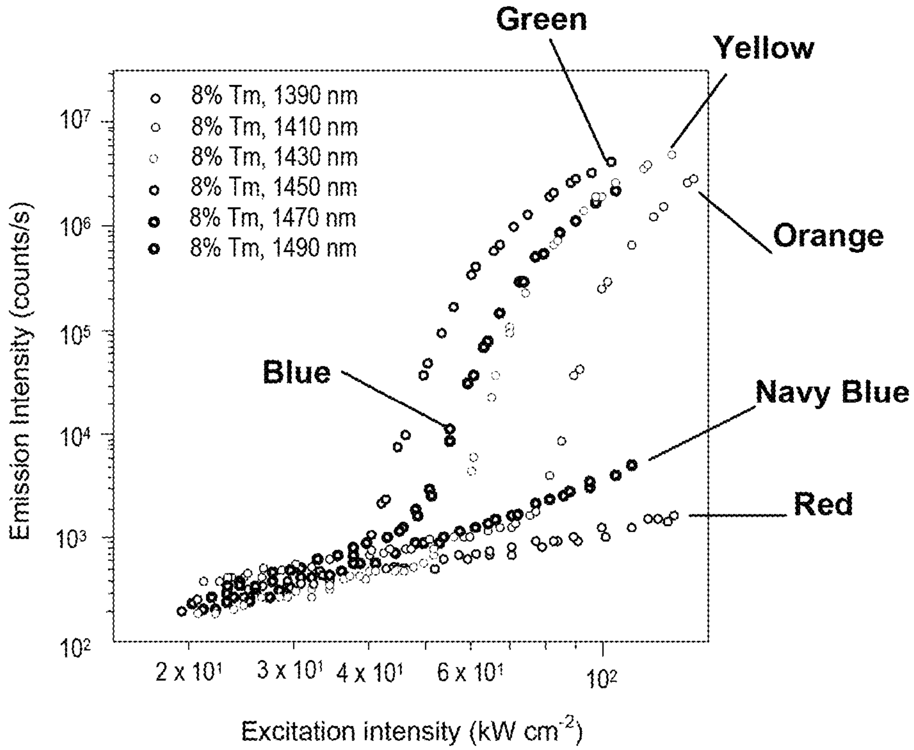
FIG. 13 is an exemplary graph illustrating excitation vs. emission intensity curves on an 8% $Tm^{3+}$ doped nanoparticle film for different excitation wavelengths in the NIR-II spectral window according to an exemplary embodiment of the present disclosure.

The exemplary modeling also predicts PA for even longer-wavelength excitation near 1450 nm, resonant with ESA between $^3F_4$ and $^3H_4$ but not with GSA. (See e.g., FIG. 1C). This can be a technologically attractive wavelength range as it can be beyond the absorption cutoff of Si-based detectors while leading to emission easily detected by Si, and can also be useful for deep-tissue imaging, including through-skull fluorescence imaging of live mouse brain at depths >2 mm. (See, e.g., Reference 43). Using 1450 nm excitation, PA, with the emission versus intensity curve showing a threshold at approximately 40 kW cm' and maximum nonlinearity s=14.9 (e.g., FIG. 2A, brown stars) was observed. More generally, the ANPs demonstrate PA for wavelengths between 1400 nm and 1470 nm (e.g., FIG. 13), with the lowest threshold occurring at 1450 nm in this range. Wavelengths can also be between about 1400 nm (plus or minus about 10%) and about 1490 nm (plus or minus about 10%). FIG. 13 illustrates an exemplary graph showing excitation vs. emission intensity curves on an 8% $Tm^{3+}$ doped nanoparticle film for different excitation wavelengths in the NIR-II spectral window according to an exemplary embodiment of the present disclosure.

Recent theoretical treatments show that achieving PA with a large nonlinearity can involve a balance between several coexisting phenomena within the material. (See, e.g., Reference 7). But in the case where the cross-relaxation rate $s_{31}$>>$W_2$, the DRE model can predict that threshold intensity can be determined entirely by $W_2$. (See e.g., references 5 and 17). In ANPs, $s_{31}$ can be controlled by $Ln^{3+}$ concentration, while the nonradiative decay component of $W_2$ can be dominated by losses at surfaces and interfaces. (See, e.g., References 29, 34, 35, 44, and 45). To determine if rebalancing these factors can reduce threshold intensity, two new 8% $Tm^{3+}$ core/shell structures designed to reduce surface losses and thus $W_2$ were synthesized. These designs include thicker shells as well as larger core size than the 8% ANPs in FIG. 2, serving to further reduce the surface-to-volume ratio. The changes indeed result in a distinct reduction in threshold, to <10 kW cm' at room temperature. (See e.g., FIGS. 3A and 9).

Figures 3A, 3B, 3C, 3D:
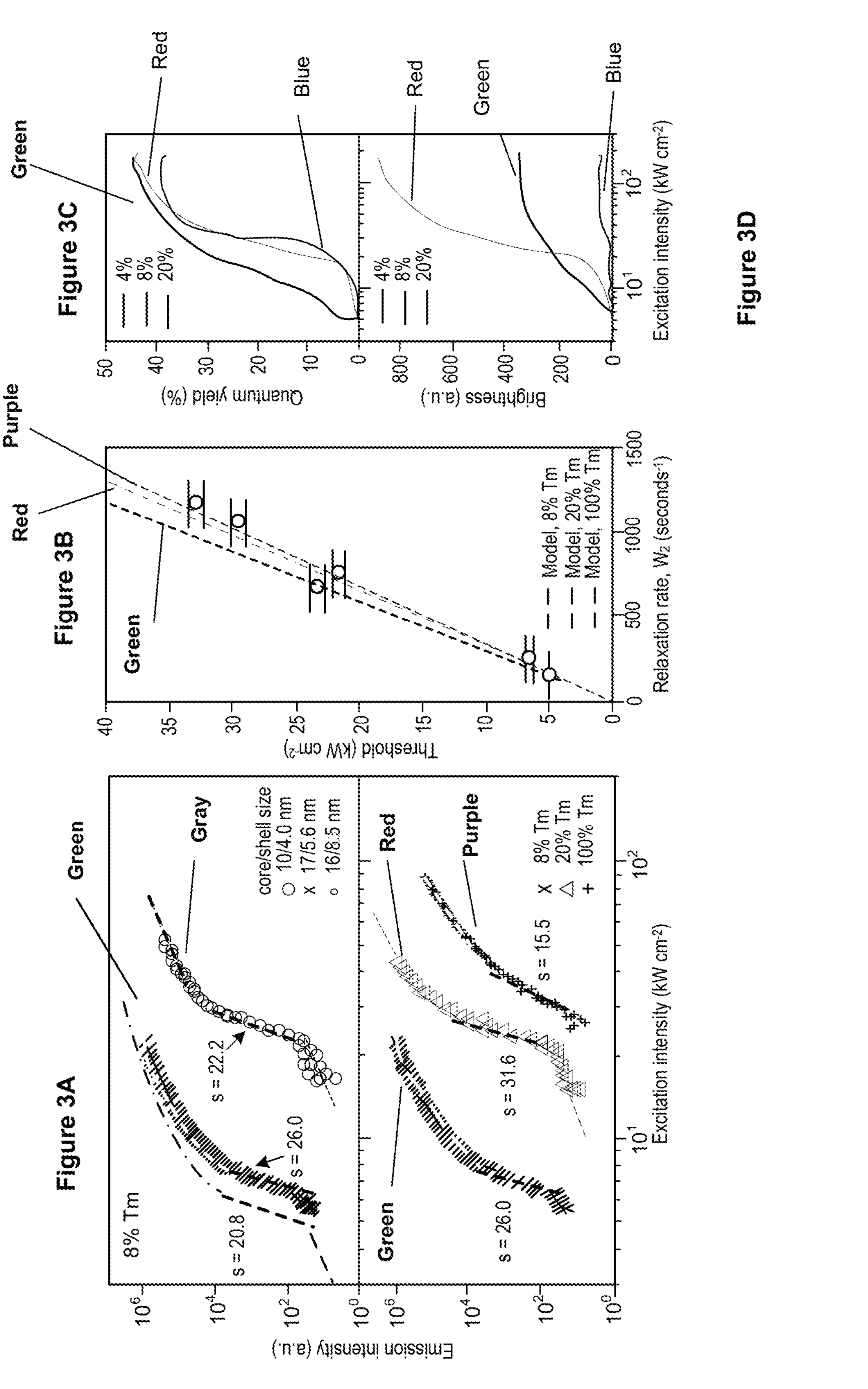
FIG. 3A is a set of exemplary graphs illustrating 800 nm emission intensity vs. 1064 nm excitation intensity curves for different core sizes/shell thicknesses of 8% $Tm^{3+}$-doped ANPs and ANPs with different $Tm^{3+}$ concentrations according to an exemplary embodiment of the present disclosure.
FIG. 3B is an exemplary graph illustrating threshold intensity vs. W2 extracted from the data in FIG. 3A according to an exemplary embodiment of the present disclosure.
FIG. 3C is an exemplary graph illustrating upconverting quantum yield according to an exemplary embodiment of the present disclosure.
FIG. 3D is an exemplary graph illustrating brightness vs. excitation intensity for 4%, 8%, and 20% $Tm^{3+}$ according to an exemplary embodiment of the present disclosure.

FIGS. 3A-3D show a set of exemplary graphs indicating a modification of PA kinetics via ANP shell thickness, surface-to-volume ratio, and $Tm^{3+}$ content accordingly to an exemplary embodiment of the present disclosure. For example, the top panel of FIG. 3A illustrates an exemplary graph indicating 800 nm emission intensity vs. 1064 nm excitation intensity curves for different core sizes/shell thicknesses of 8% $Tm^{3+}$-doped ANPs accordingly to an exemplary embodiment. The bottom panel of FIG. 3A shows an exemplary graph showing ANPs with different $Tm^{3+}$ concentrations according to an exemplary embodiment of the present disclosure. Green×symbols refer to 8% $Tm^{3+}$, same for the top panel. Red triangles refer to 20% $Tm^{3+}$, (see sample 7 data shown; curve for sample 6 with 20% $Tm^{3+}$ shown in FIGS. 7 and 9). Purple+ symbols refer to 100% $Tm^{3+}$. See SI Tables 1 and 2 for measured dimensions and their standard deviations. The dash-dotted lines are fits of the PA DRE model to the data. All measurements on ensemble films. FIG. 3B is an exemplary plot of threshold intensity vs. $W_2$ extracted from the data in (FIG. 3A), showing linear dependencies on $W_2$, with slopes that depend on $s_{31}$ according to an exemplary embodiment of the present disclosure. Error bars can be determined from the standard deviations of the curve fittings shown in FIG. 7. FIG. 3C shows an exemplary graph indicating exemplary calculations of upconverting quantum yield, and FIG. 3D illustrates an exemplary graph indicating brightness vs. excitation intensity for 4%, 8%, and 20% $Tm^{3+}$, using values from model fits to the green circles and red squares in (see FIG. 3A), and the blue circles provided in FIG. 2A.

Figure 7:
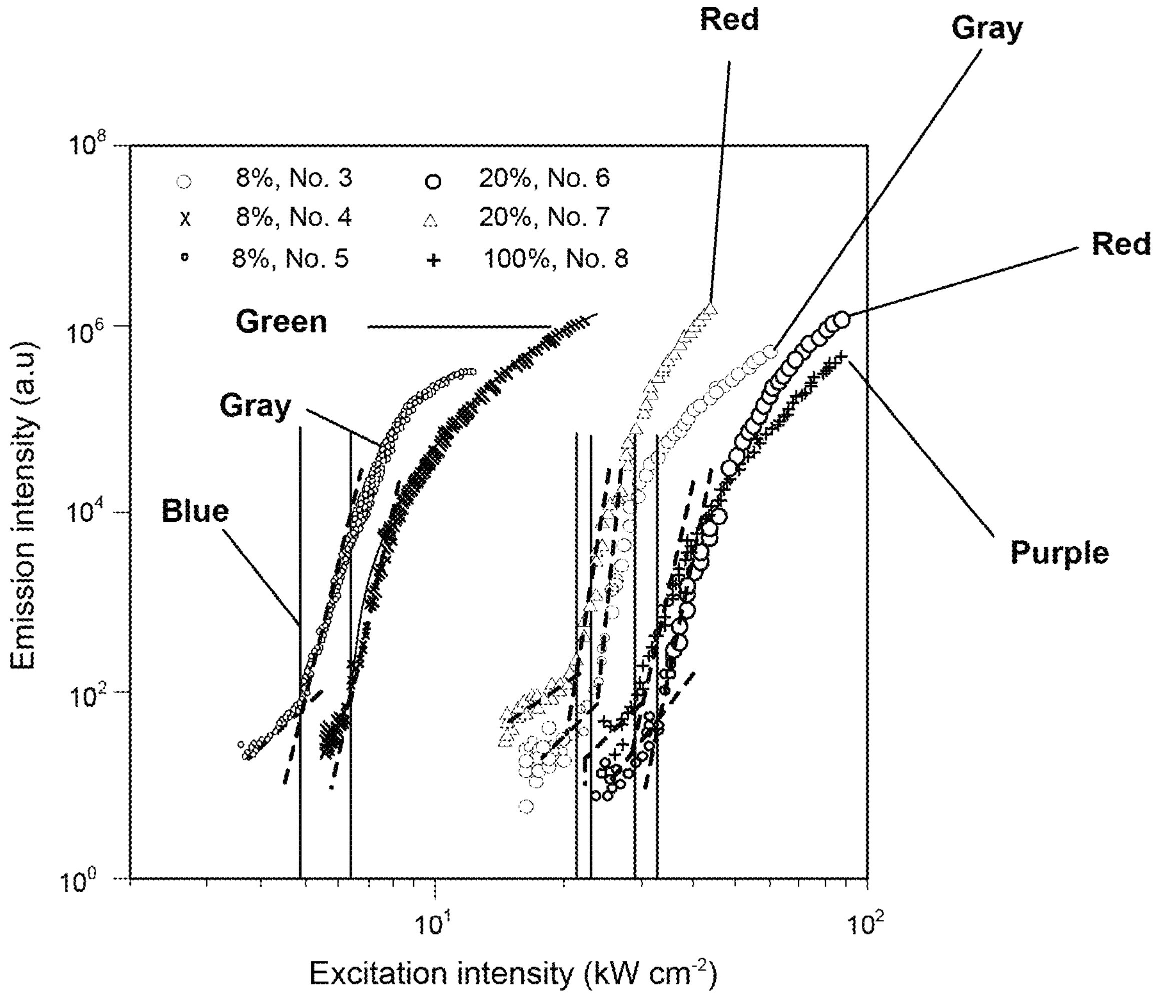
FIG. 7 is an exemplary graph illustrating the determination of photon avalanche thresholds according to an exemplary embodiment of the present disclosure.
Figure 8:
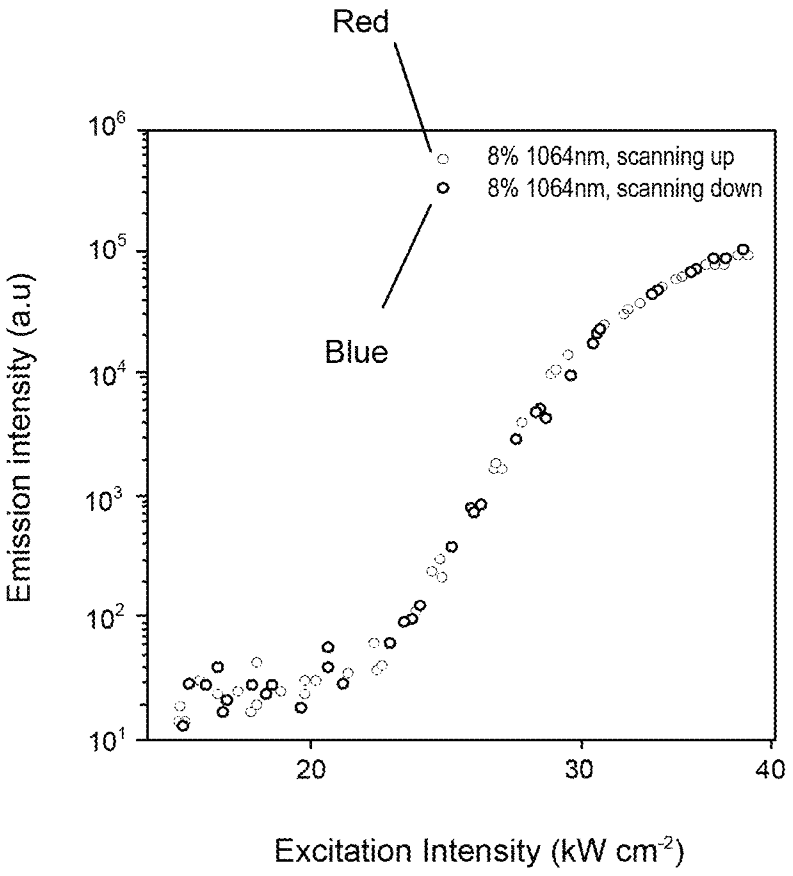
FIG. 8 is an exemplary graph illustrating increasing and decreasing excitation power scans for 8% Tm3+ doped nanocrystals according to an exemplary embodiment of the present disclosure.

FIG. 7 illustrates an exemplary graph showing an exemplary determination of photon avalanche thresholds according to an exemplary embodiment of the present disclosure. The threshold value can reflect the change in slope of the emission intensity vs. excitation intensity curve (measurements on ensemble films). Dotted black lines are linear fits of the data points below and above threshold, where the intersection is considered the photon avalanche threshold. Percentage values are $Tm^{3+}$ doping, and sample numbers are listed (see Table 1 for sample info). Threshold values are listed in Table 3.

Figure 9:
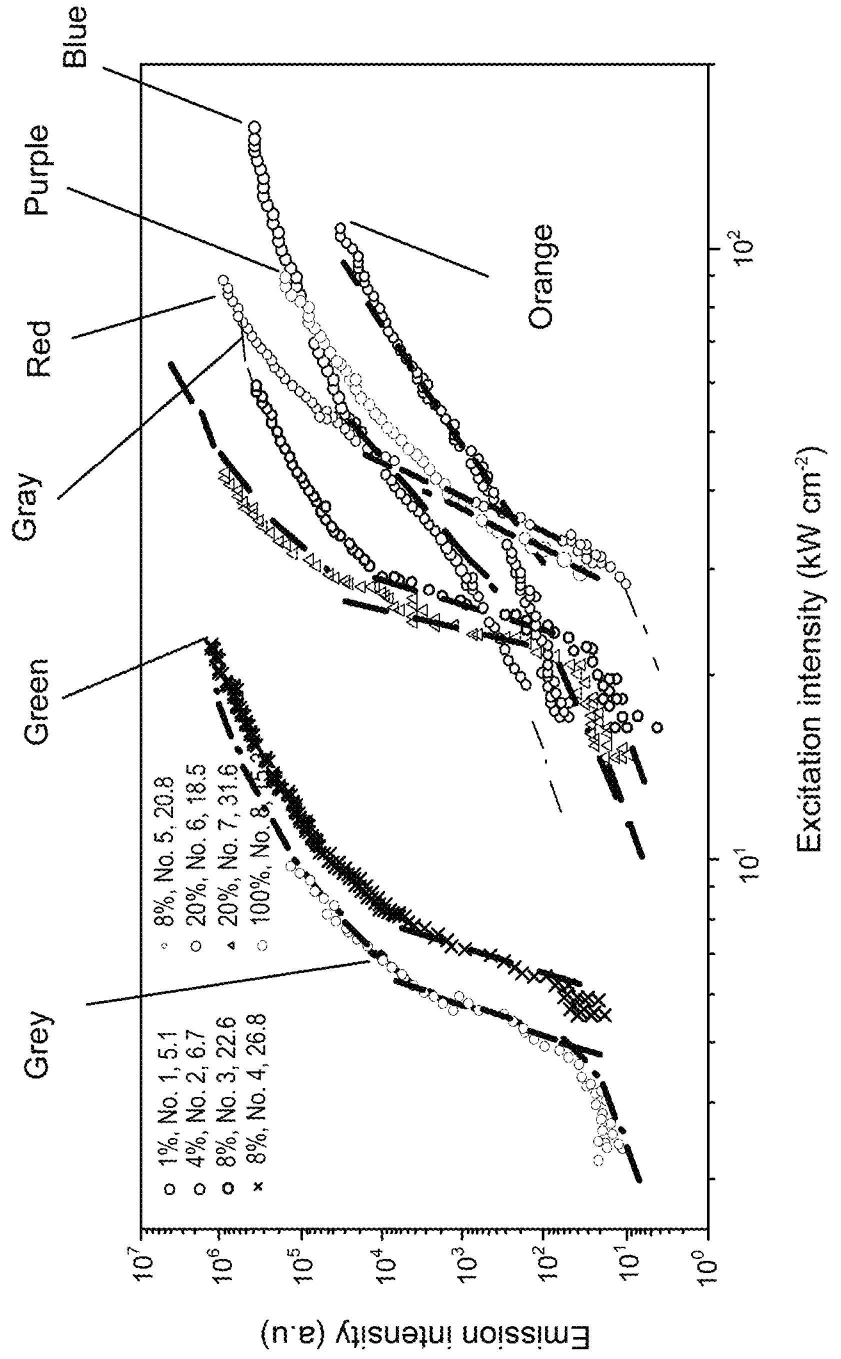
FIG. 9 is an exemplary graph illustrating 800 nm emission intensity vs. 1064 nm excitation intensity curves for different core sizes/shell thicknesses of 1-100% Tm3+-doped ANP ensembles.

FIG. 9 shows an exemplary graph providing an exemplary indication of 800 nm emission intensity vs. 1064 nm excitation intensity curves for different core sizes/shell thicknesses of 1-100% $Tm^{3+}$-doped ANP ensembles. $Tm^{3+}$ concentrations, sample numbers (see FIG. 5, Table 1), and slope values of the log-log curves are shown in FIG. 9 in the associated legend.

Increasing the $Tm^{3+}$ content can change $s_{31}$ and $W_2$, and therefore the PA excitation threshold intensity. To study this effect, core/shell ANPs with 20% and 100% $Tm^{3+}$ were synthesized (e.g., including two sizes of 20% $Tm^{3+}$ ANPs; FIGS. 4A-4H), and threshold intensity can be found to increase with increasing $Tm^{3+}$ content. (See e.g., FIG. 3A). This can be consistent with recent studies showing that, at these pump intensities, excited-state lifetimes can be reduced (e.g., $W_2$ can be increased) as Ln content increases within nanoparticles, with the resulting increase in ion-ion ET opening many potential relaxation pathways that act collectively to depopulate and repopulate the levels. (See, e.g., References 29 and 46).

Exemplary models can predict a linear dependence between PA threshold intensity and $W_2$, with a slope that can be determined by $s_{31}$, $W_3$ (e.g., the excited-state decay rate; see e.g., FIG. 1A), and the excited-state relaxation branching ratio. (See, e.g., Reference 5 and 17). These exemplary dependencies are shown in FIG. 3B for three different $Tm^{3+}$ concentrations. As $s_{31}$ increases, $W_3$ and the branching ratio become less important, leading to a slight reduction in slope in the threshold intensity-$W_2$ curves. The presence of the 20% and 100% $Tm^{3+}$ data points on nearly the same line can demonstrate that by the time $Tm^{3+}$ content reaches 20%, $s_{31}$ can dominate, and the relative effects of $W_3$ and the branching ratio can become almost negligible. This well-defined relationship between the PA threshold and $W_2$ shown in FIG. 3B has important implications for sensing applications, where $W_2$ can be modulated by environmentally dependent ET to the ANP surface, with small changes in $W_2$ (e.g., and thus threshold) resulting in large changes in luminescence for a given pump intensity.

To evaluate the efficiency and relative brightness of ANPs, a kinetic computational model of ET within $Ln^{3+}$- doped nanoparticles was used, similar to those used to reproduce the experimental upconverting quantum yields ("QYs") of $Er^{3+}/Yb^{3+}$ co-doped UCNPs[33,47], as well as ELNPs (see, e.g., Reference 22) ("SI"). The exemplary calculations reveal that for fully passivated core-shell nanoparticles, QY can reach approximately 40% for ANPs excited beyond threshold at $10^5$ W $cm^{-2}$. (See e.g., FIG. 3C). While the model has known limitations—in particular, the absence of higher-energy excited states—calculated QYs can be consistent both with previous QY calculations for ELNPs (see, e.g., Reference 22) and QY measurements of PA-induced upconversion in fibers at room temperature. (See, e.g., Reference 16). In the exemplary calculations, it was found that while the 8% $Tm^{3+}$ ANPs can be somewhat more efficient than 20% ANPs at this pump fluence, the 20% ANPs can be brighter. (See e.g., FIG. 3C). This can be because brightness can be a function of QY, but also the total number of emitters within the ANP (e.g., brightness can be defined as the product of the wavelength-dependent $Tm^{3+}$ ion absorption cross-section, the $Tm^{3+}$ concentration, and QY). The emission intensity shows a more nonlinear dependence on pump fluence than does QY, since the extreme nonlinearity of PA emission can be a function of both intensity-dependent QY and excited-state populations.

An application for ANPs can be single-particle superresolution imaging, as elucidated by the recently proposed photon-avalanche single-beam superresolution imaging ("PASSI") concept that exploits the extreme nonlinear response of PA. (See, e.g., Reference 7). The size of the imaging point spread function in scanning confocal microscopy ("SCM") scales inversely with the square root of the degree of nonlinearity s (e.g., as in multiphoton microscopy) (see, e.g., Reference 7), with the full width at half maximum ("FWHM") of an imaged nonlinear emitter in SCM given by:

$$FWHM = \lambda / (2 \cdot NA \cdot \sqrt{s}) \tag{1}$$

in the Gaussian optics approximation (see, e.g., Reference 48) (e.g., where NA can be numerical aperture and λ can be wavelength). Therefore, deeply sub-wavelength resolution can be realized automatically with ANPs during standard SCM. The imaging may not need complex instrumentation, excitation beam shaping or patterning, image post-processing, or alignment procedures. (See, e.g., Reference 7).

Figures 4A, 4B, 4C, 4D, 4E, 4F, 4G, 4H:
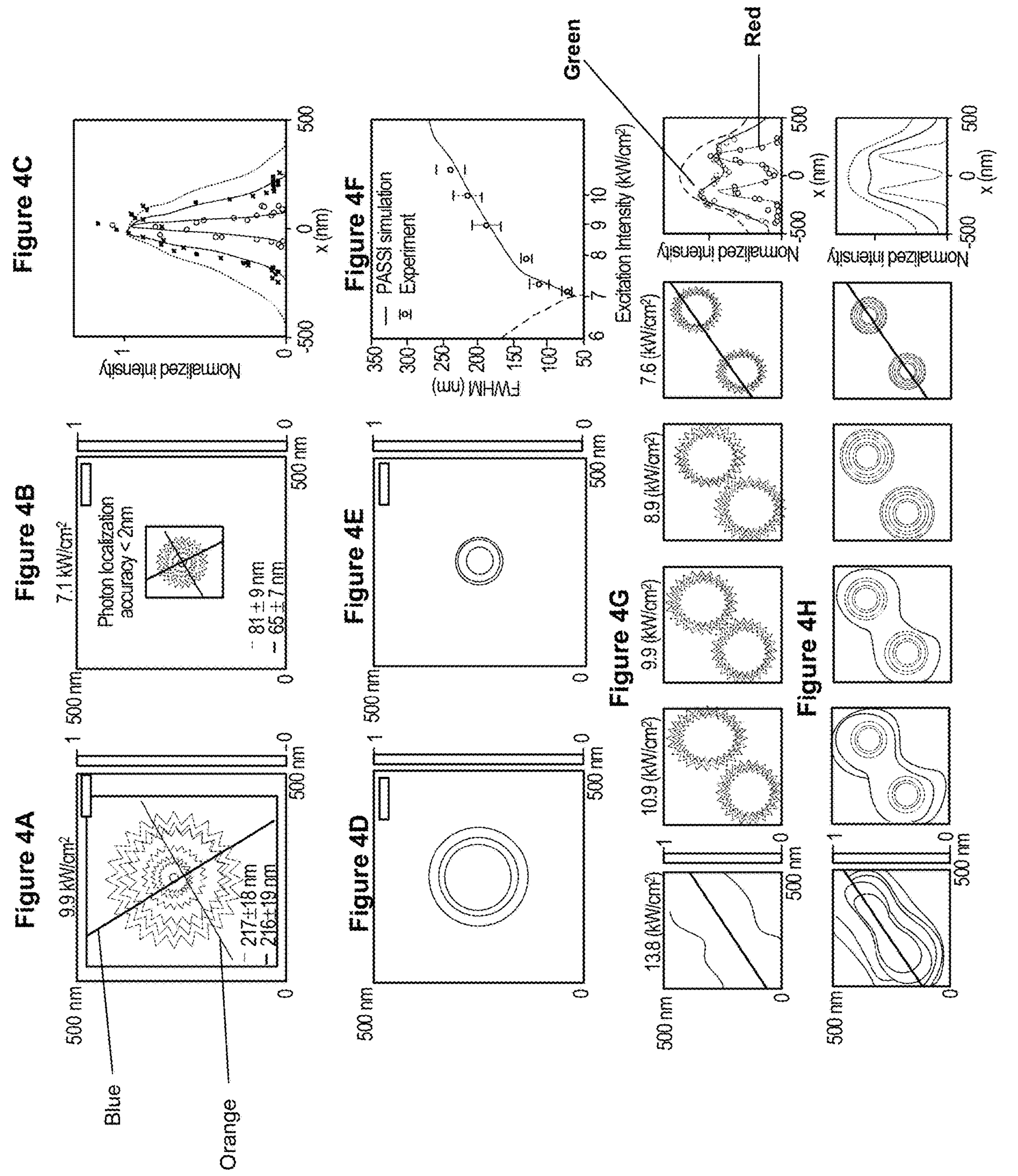
FIGS. 4A and 4B are exemplary images of a single 8% $Tm^{3+}$ ANP when excited according to an exemplary embodiment of the present disclosure.
FIG. 4C is an exemplary graph illustrating normalized intensity for FIGS. 4A and 4B according to an exemplary embodiment of the present disclosure.
FIGS. 4D and 4E are exemplary images produced using simulations of PASSI images for the same excitation intensities shown in FIGS. 4A and 4B according to an exemplary embodiment of the present disclosure.
FIG. 4F is an exemplary graph illustrating measured vs. simulated FWHMs of single-ANP PASSI images as a function of excitation intensity according to an exemplary embodiment of the present disclosure.
FIG. 4G is a set of exemplary PASSI images and a graph of 8% $Tm^{3+}$ ANPs, separated by 300 nm, excited at decreasing intensities, from near saturation to near threshold according to an exemplary embodiment of the present disclosure.
FIG. 4H is a set of exemplary PASSI images and a graph of 8% $Tm^{3+}$ ANPs produced using a simulation, separated by 300 nm, excited at decreasing intensities, from near saturation to near threshold according to an exemplary embodiment of the present disclosure.

FIGS. 4A-4H illustrate exemplary images and graphs showing photon-avalanche single-beam superresolution imaging. In particular, FIGS. 4A and 4B show exemplary images of a single 8% $Tm^{3+}$ ANP when excited in the saturation regime (9.9 kW $cm^{-2}$) (see FIG. 3A), and in the PA regime (7.1 kW $cm^{-2}$) (see FIG. 3B). FIG. 4C illustrates an exemplary graph provides exemplary linecuts corresponding to the blue lines in FIGS. 3A and 3B, along with a linecut through a theoretical diffraction-limited focused Gaussian spot (for example, for NA=1.49, λ=1064 nm). FIG. 4D provides an exemplary image showing simulations of PASSI images for the same excitation intensities in FIGS. 3A and 3B based on the measured emission vs. intensity curve shown in FIG. 3A (green×symbols). (See, e.g., Reference 7). FIG. 4F shows an exemplary graph showing measured (black) vs. simulated (red) FWHMs of single-ANP PASSI images as a function of excitation intensity. The exemplary PASSI simulations utilize values from the experimentally measured emission vs. intensity curve shown in FIG. 3A (green×symbols). Error bars are the root mean square of the standard deviations of Gaussian curve fittings of the two linecuts for each power in FIG. 14. FIG. 4G illustrates an exemplary image showing experimental PASSI images of 8% $Tm^{3+}$ ANPs, separated by 300 nm, excited at decreasing intensities, from near saturation (left) to near threshold (right). Linecuts from the color-coded lines in the images, along with a linecut through a theoretical diffraction-limited image of linear emission from two emitters spaced by 300 nm (black dashed line) (far right). FIG. 4H shows an exemplary image providing substantially the same results as provided in FIG. 3G, except for PASSI simulations.

Figure 14:
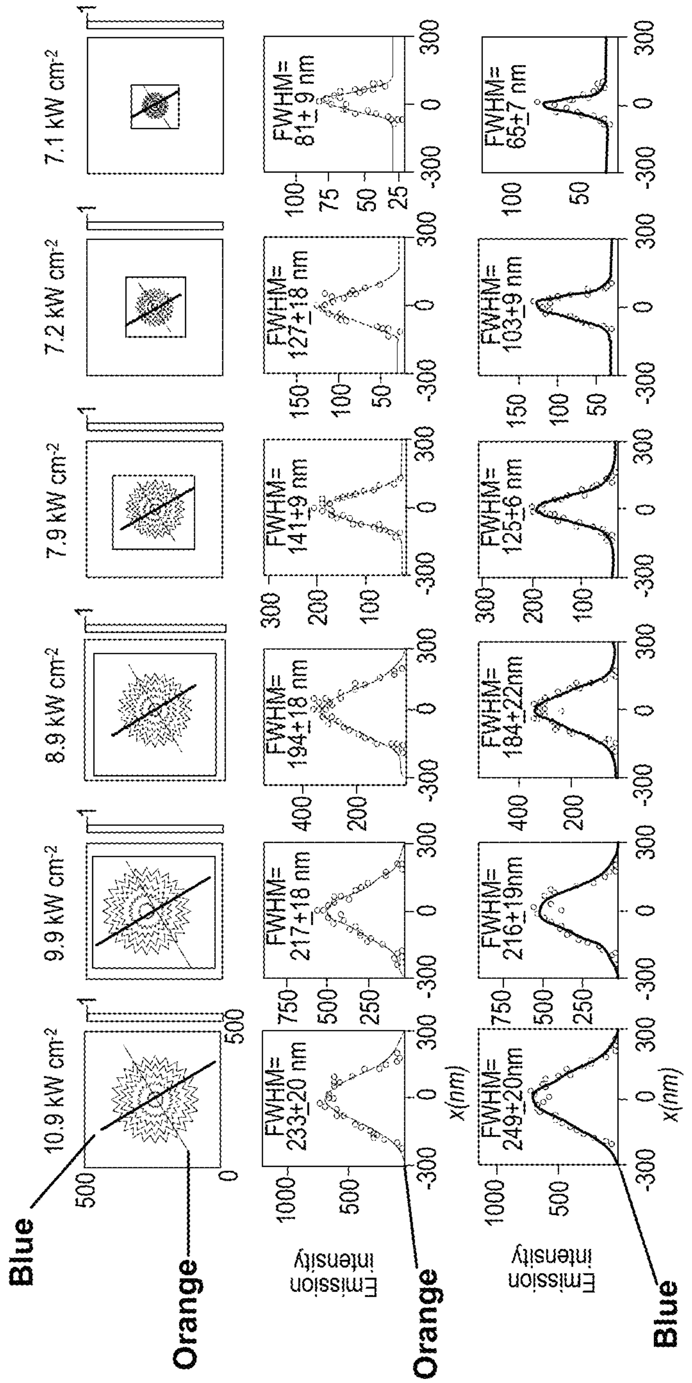
FIG. 14 is a set of sub-diffraction resolution images and graphs of data points fitted as Gaussian line shapes according to an exemplary embodiment of the present disclosure.

FIG. 14 illustrates a set of exemplary images and graphs showing 2D sub-diffraction resolution imaging of a single 8% $Tm^{3+}$ core/shell ANPs accordingly to an exemplary embodiment of the present disclosure. Exemplary data points extracted along the linecuts are shown as circles the same color as linecuts. Data are fitted as Gaussian lineshapes. FWHM values and standard deviations of fitting are denoted in the plots. Narrowest FWHM is achieved with 7.1 kW $cm^{-2}$ excitation intensity (right panels) and threshold value is 6.4 kW $cm^{-2}$ (see Table 3)

Exemplary single-ANP imaging, measuring a PASSI image spot of ≤75 nm average FWHM when excited at 1064 nm at the optimal pump intensity for PASSI was performed, which corresponds to emission intensity at the top of the steep segment of the response curve. (See, e.g., Reference 7). More specifically, the image of the 8% $Tm^{3+}$ ANP, from the batch with s=26 (e.g., FIG. 3A), shows a short-axis FWHM of 65±7 nm and a long-axis FWHM of 81±9 nm (see, e.g., FIGS. 4B and 14), with its elliptical shape due to a slightly elliptical excitation spot. This spot size agrees well with PASSI simulations. (See e.g., FIG. 4E). The comparison with a diffraction limited excitation spot size of 357 nm FWHM clearly shows the advantage of the extreme nonlinearity of PA. (See e.g., FIG. 4A). As shown in FIG. 4A, the spot size can be approximately 220 nm FWHM when excited closer to the saturation regime, where the degree of nonlinearity s can be significantly lower, as predicted. (See, e.g., Reference 7). (See e.g., FIG. 4D). The theoretical resolution limit considering s=26 can be 70 nm, in excellent agreement with the measured values. PASSI superresolution and its unique power dependence can be readily apparent with two ANPs separated by 300 nm just resolvable when excited near saturation, but easily resolvable for intensities in the steep-slope region of the PA emission versus pump intensity curve. (See, e.g., FIGS. 4G and 4H). The resolution can be fully determined by the slope of the power-dependent emission (e.g., FIG. 4F) curve, facilitating the selection of the optimal intensity for imaging for a given ANP architecture once that curve can be measured. (See, e.g., Reference 7). Beyond PASSI, there can also be notable advantages for combining the steeply nonlinear ANPs with existing superresolution approaches. (See e.g., Table 11). For example, the extreme nonlinearity and anti-Stokes luminescence can improve the achievable signal-to-noise and resolution limits of methods such as nonlinear structured illumination microscopy ("SIM") and near-infrared emission saturation ("NIRES") (see, e.g., Reference 49) nanoscopy for a given photon budget. (See, e.g., References 9 and 10). Additionally, applying the photon localization accuracy concept to PASSI images (e.g., FIG. 4B), which already exhibit sub-100 nm resolution, yields a localization accuracy of <2 nm for only 7600 collected photons, compared to the 10-40 nm accuracies typically achieved. (See, e.g., Reference 8). Realizing that the longer rise times might limit scan rates (see, e.g., Reference 50), a multi-point excitation procedure (see, e.g., FIGS. 15A, 15B, 16A, 16B, and 17A-17C) was performed, which suggests possible scan rates of approximately 4 seconds or less per frame can be achievable and reasonable using multi-point PASSI.

Figure 15A:
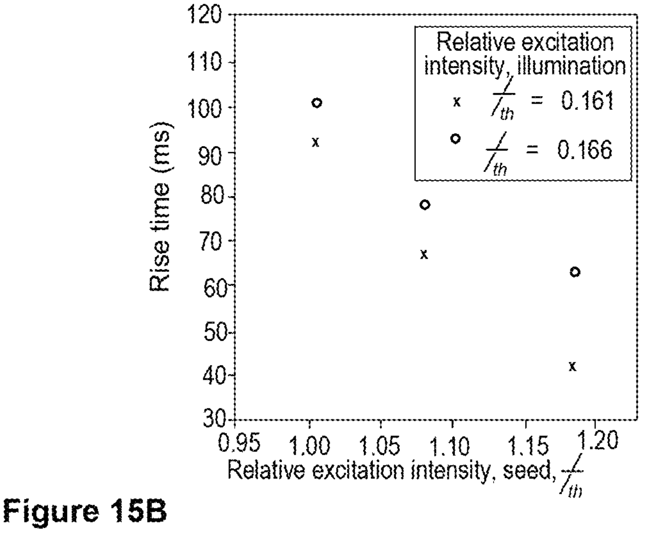
FIG. 15A is an exemplary graph illustrating measured rise time vs. seed excitation intensity according to an exemplary embodiment of the present disclosure.
Figure 15B:
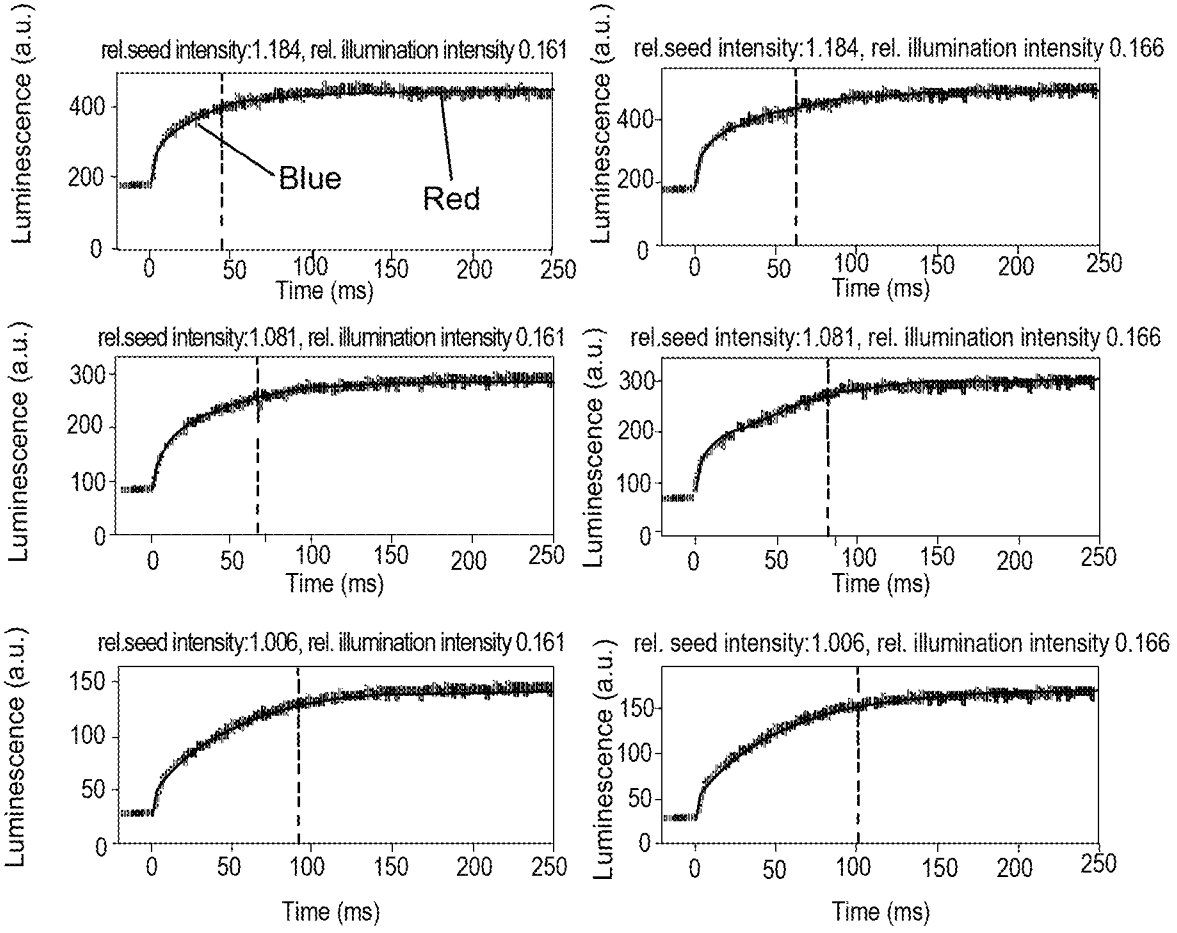
FIG. 15B is a set of exemplary graphs illustrating time-resolved luminescence depending on seed and illumination excitation intensities according to an exemplary embodiment of the present disclosure.

FIGS. 15A and 15B provide exemplary graphs showing reduction of rise time with seed excitation according to an exemplary embodiment of the present disclosure. In particular, FIG. 15A illustrates an exemplary graph showing measured rise time vs. seed excitation intensity (intensities normalized to threshold intensity $I_{th}$). Seed excitation can be pre-irradiation onto the sample before the illumination excitation. Rise time can be measured with continuous seed excitation and oscillating illumination excitation (square wave). FIG. 15B shows a set of exemplary graphs showing time-resolved luminescence depending on seed and illumination excitation intensities. Red curves are bi-exponential fitting curves and black dashed lines indicate 90% rise time.

Figure 16A:
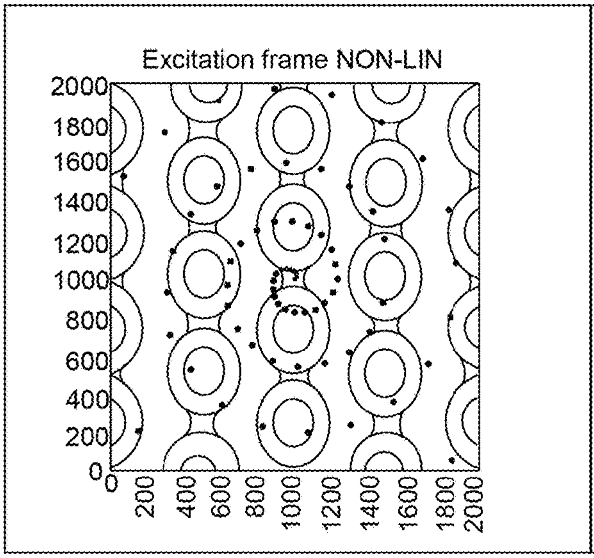
FIG. 16A is an exemplary hexagonal excitation pattern overlapped with an ANP phantom according to an exemplary embodiment of the present disclosure.
Figure 16B:
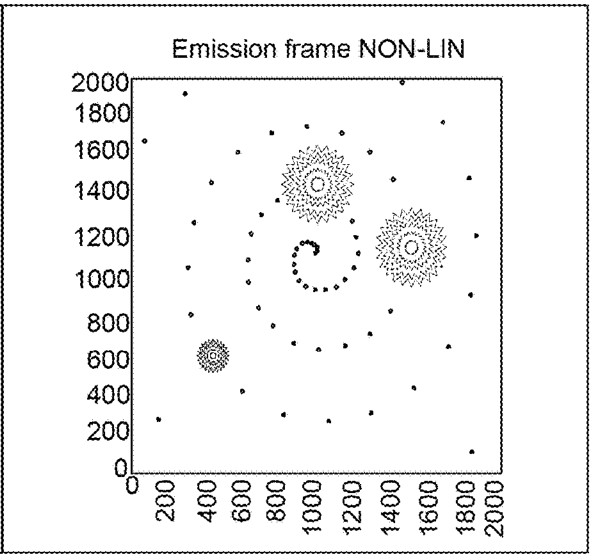
FIG. 16B is an exemplary luminescence image of only excited ANPs according to an exemplary embodiment of the present disclosure.

FIG. 16A shows an exemplary image of a hexagonal excitation pattern (orange) overlapped with an ANP phantom (spiral dots) according to an exemplary embodiment of the present disclosure. Efficient photoexcitation can obtained only for those ANPs that are very near the center of excitation patterns (green NPs). FIG. 16B illustrates an exemplary image showing only the excited ANPs contribute to luminescence image in a significant way according to an exemplary embodiment of present disclosure.

Figures 17A, 17B, 17C:
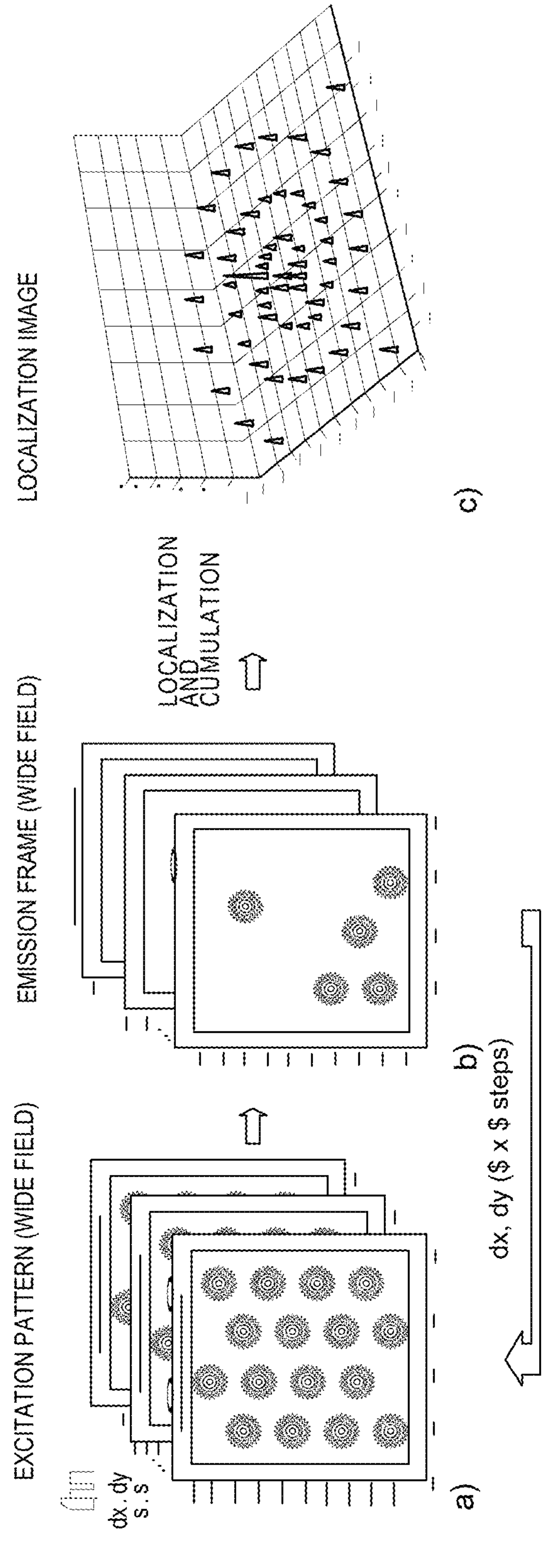
FIG. 17A is an exemplary diagram illustrating photon avalanching luminescence generation and ANP localization according to an exemplary embodiment of the present disclosure.
FIG. 17B is an exemplary hexagonal pattern being moved by pattern period divided by 5, to get 5×5=25 frames according to an exemplary embodiment of the present disclosure.
FIG. 17C is an exemplary localization image according to an exemplary embodiment of the present disclosure.

FIG. 17A shows an exemplary schematic presentation of parallel PASSI imaging using hexagonal multi-photoexcitation spots according to an exemplary embodiment of present disclosure. FIG. 17B illustrates an exemplary schematic presentation of parallel PASSI imaging using PA luminescence generation and ANP localization according to an exemplary embodiment of the present disclosure. The steps (A) and (B) in FIGS. 17A and 17B can be repeated for the hexagonal pattern being moved by pattern period divided by 5, to get 5×5=25 frames. By accumulation of localization of all these 25 frames, the ANP phantom is reconstructed with c.a. 80 nm optical resolution, which is displayed in FIG. 17C.

Additionally, in characterizing this PA system, an approximately 500-10,000-fold increases in emission intensity was measured when pump intensity can be increased from threshold $$(I_P^{th})$$

to twice the threshold value, which can be beyond the steep-slope region of the ANP response curve. (See e.g., FIGS. 2A and 3A). This enhancement, which can be defined as the parameter $$\Delta_{av} = I_E(2I_P^{th})/I_E(I_P^{th}),$$

can be substantially larger than in reported energy-looping systems (e.g., $\Delta_{av} \leq 50$; references 11 and 22) and suggests a simpler empirical method of identifying PA using a single measurable ratio. $\Delta_{av}$ captures the complex balance between $R_2/R_1$, cross-relaxation, and radiative vs non-radiative relaxation. (See, e.g., Reference 7). All nanoparticles with ≥8% $Tm^{3+}$ content reported here can meet this criterion (e.g., Table 9, with a maximum value of approximately 10,000 attained with 20% $Tm^{3+}$ ANPs, while a borderline value of approximately 500 can be seen in the 100% $Tm^{3+}$ ANPs, where the large increase in cross-relaxation rates leads to faster nonradiative depopulation of $^3H_4$. (See, e.g., Reference 46).

Further, steeply nonlinear nanomaterials, realizing photon avalanching in engineered nanocrystals at room temperature with continuous wave pumping were observed. Core-shell architectures doped with only $Tm^{3+}$ ions exhibit avalanching behavior for $Tm^{3+}$ concentrations ≥8% were observed, and that the PA excitation threshold intensity can be fully determined by the $^3F_4$ intermediate state lifetime at higher concentrations. Further, PA can be achieved for excitation in the 1400-1470 nm range in addition to 1064 nm. Along with emission intensities that scale nonlinearly with pump intensity up to the $26^{th}$ power—enabling sub-70 nm SCM imaging resolution and <2 nm photon localization—these results can open new applications in local environmental, optical, and chemical reporting, and in superresolution imaging.

EXEMPLARY METHODS

Exemplary Materials

Sodium trifluoroacetate (e.g., Na-TFA, 98%), sodium oleate, ammonium fluoride ("$NH_4F$"), Yttrium chloride ("$YCl_3$", anhydrous, 99.99%), thulium chloride ("$TmCl_3$", anhydrous, 99.9+%), Gadolinium chloride ("$GdCl_3$", anhydrous, 99.99%), yttrium trifluoroacetate (e.g., 99.99+%), oleic acid ("Office Action", 90%), and 1-octadecene ("ODE", 90%) were purchased from Sigma-Aldrich.

Exemplary Synthesis of Core ANPs

The synthesis of $NaY_{1-x}Tm_xF_4$ ANP cores, with average diameters ranging from d=10 to 18±1 nm (see e.g., Table 1) was based on reported procedures. (See, e.g., Reference 44). For the case of x=0.01 (e.g., meaning 1% $Tm^{3+}$ doping), $YCl_3$ (e.g., 0.99 mmol, 193.3 mg) and $TmCl_3$ (e.g., 0.01 mmol, 2.8 mg) were added into a 50 ml 3-neck flask, followed by an addition of 6 ml OA and 14 ml ODE. The solution was stirred under vacuum and heated to 100° C. for 1 hour. During this time, the solution became clear. After that, the flask was subjected to three pump/purge cycles, each consisting of refilling with $N_2$ and immediately pumping under vacuum to remove water and oxygen. Thereafter, sodium oleate (e.g., 2.5 mmol, 762 mg) and $NH_4F$ (e.g., 4 mmol, 148 mg) were added to the flask under $N_2$ flow. Subsequently, the resealed flask was placed under vacuum for 15 min at 100° C., followed by 3 pump/purge cycles. Subsequently, the flask was quickly heated from 100° C. to 320° C. (e.g., the approximate ramp rate was 25° C./min). The temperature was held at 320° C. for 40-60 min, after which the flask was rapidly cooled to room temperature with a stream of compressed air.

To isolate the nanoparticles, ethanol was added to the solution, and the precipitated nanoparticles were isolated by centrifugation (e.g., 5 min at 4000 rpm). The pellet was suspended in hexanes and centrifuged to remove large and aggregated particles. The nanoparticles remaining in the supernatant were washed two additional times by adding ethanol, isolating by centrifugation, and dissolving the pellet in hexanes. The nanoparticles were stored in hexanes with two drops of oleic acid to prevent aggregation.

Exemplary Shell Growth

A 0.1 M stock solution of 20% $GdCl_3$ and 80% $YCl_3$ was prepared by adding $YCl_3$ (e.g., 2 mmol, 390.5 mg), $GdCl_3$ (e.g., 0.5 mmol, 131.8 mg), 10 ml OA and 15 ml ODE to a 50 ml 3-neck flask. The solution was stirred and heated to 110° C. under vacuum for 30 min. After that, the flask was filled with $N_2$ and heated to 200° C. for about 1 h, until the solution became clear and no solid was observed in the flask. Subsequently, the flask was cooled to 100° C. and placed under vacuum for 30 min. A 0.2 M solution of Na-TFA was prepared by stirring Na-TFA (e.g., 4 mmol, 544 mg), 10 ml OA and 10 ml ODE in a flask, under vacuum, at room temperature for 2 h, ensuring that all chemicals were dissolved. Using a nanoparticle synthesis robot, the Workstation for Automated Nanocrystal Discovery and Analysis ("WANDA"), 3-9 nm $NaY_{0.8}Gd_{0.2}F_4$ shells (see Table 1) were grown on ANP cores using a layer-by-layer protocol. (See, e.g., Reference 3). Briefly, for a 3 nm shell thickness, 6 mL ODE and 4 mL OA were added to the dried ANP cores and heated to 280° C. at 20° C./min in the WANDA glove box. The automated protocol alternated between injections of a 0.2 M Na-TFA stock solution and a 0.1 M stock solution of 20% Gadolinium and 80% Yttrium oleate solution. One injection was performed every 20 minutes for a total of 12 injections (e.g., 6 injections for each precursor). Following the last injection, each reaction was annealed at 280° C. for an additional 30 minutes and then cooled rapidly by nitrogen flow. The particles were isolated and purified according to the purification protocol described for ANP cores. Core-shell $NaYF_4$ nanoparticles doped with $Tm^{3+}$ (e.g., 1-100%) were synthesized using analogous methods.

Exemplary Nanoparticle Characterization

TEM was performed using a JEOL JEM-2100F field emission transmission electron microscope ("TEM") at an acceleration voltage of 200 kV, a FEI Themis 60-300 STEM/TEM operating at an acceleration voltage of 300 kV and a Tecnai T20 S-TWIN TEM operating at 200 kV with a $LaB_6$ filament. Size statistics were acquired for approximately 100 nanoparticles using ImageJ software. X-Ray diffraction ("XRD") measurement was performed using a Bruker D8 Discover diffractometer with Cu Kα radiation. Average core diameter and shell sizes are given in FIG. 3A. The larger cores can be slightly prolate in shape. (See e.g., FIG. 6).

Exemplary Preparation of Nanocrystal Film Samples

Nanoparticles (e.g., 40 μL of a 1 μM suspension in hexane) were either drop-cast or spincoated on a coverslip. AFM measurements (e.g., Bruker Dimension AFM) were performed to measure the thicknesses of the films.

Exemplary Optical Characterization of ANPs

For single-ANP imaging, a dilute dispersion of nanoparticles was deposited on a glass coverslip and placed on an inverted confocal microscope (e.g., Nikon, Eclipse Ti—S inverted microscope). A 1064-nm continuous-wave diode laser (e.g., Thorlabs, FELH 750) or a Ti-sapphire pulsed laser (e.g., Coherent, Chameleon OPO Vis, 1390-1510 nm, 80 MHz) were directed into the back aperture of a 1.49NA 100× immersion oil objective (e.g., Olympus), and focused directly to the sample on an 3D (e.g., XYZ) nanoscanning piezo stage (e.g., Physik Instrumente, P-545.xR8S Plano).

For measurements on film samples, a 0.95NA 100× air objective lens (e.g., Nikon) was used. Emitted light was collected back through the same objective, filtered by 850-nm short-pass (e.g., Thorlabs, FESH 850) and 750-nm long-pass (e.g., Thorlabs, FELH 750) filters and sent to an EMCCD-equipped spectrometer (e.g., Princeton Instruments, ProEM: $1600^2$ eXcelon™3) or a single-photon avalanche diode (e.g., Micro Photon Device, PDM series). For power dependence measurements, a neutral density wheel with a continuously variable density was used, synchronized with the collection system and automatically rotated by an Arduino-controlled rotator. Powers were simultaneously recorded by a Thorlabs power meter by using a glass coverslip to reflect approximately 10% of the incoming flux. Average excitation power densities were calculated using measured laser powers and using the $1/e^2$ area calculated from the imaged laser spot.

Exemplary Time-Resolved Photoluminescence

Samples were excited with a diode laser (e.g., Thorlabs) modulated at frequencies from 0.5 to 5 Hz by a function generator (e.g., Stanford Research Systems DS345). Emitted light collected by the 0.95NA 100× objective (e.g., Nikon) was detected by a single photon avalanche diode (e.g., Micro Photon Device, PDM series). A time-correlated single-photon counting ("TCSPC") device (Picoquant, Hydraharp 400) was used to record the timing data.

PA Mechanism in ANPs

As discussed herein, a single ground-state absorption ("GSA") event in lanthanide-based PA$^{initiates}$ a chain reaction of excited-state absorption ("ESA") and cross-relaxation events between lanthanide ("$Ln^{3+}$"") ions, resulting in the emission of many upconverted photons. This mechanism amplifies the population of excited states, such as the 800-nm-emitting $Tm^{3+}$ $^3H_4$ level (FIG. 1C), through a positive feedback loop of ESA from an intermediate state ("$^3F_4$") followed by cross-relaxation (e.g., an energy transfer process) back down to the same intermediate state while promoting a second ground-state $Tm^{3+}$ ion up to its intermediate state (e.g., note that the cross-relaxation process can be accompanied by the emission of phonons to compensate an energy mismatch of ca. 1200 $cm^{-1}$). This process can effectively double the $^3F_4$ population on every iteration of the loop, and the repeated looping results in nonlinear amplification of excited state populations.

The ESA can be effective because the absorption peak for the electronic $^3F_2$-$^3F_4$ transition can be close to the 1064 nm excitation wavelength. However, the 1064 nm photons can have an energy mismatch of approximately 1200 $cm^{-1}$ for the electronic $^3H_6$-$^3H_5$ transition, which decreases the GSA cross section at that wavelength. Due to the energetic mismatch, GSA can be a phonon-assisted process in this case, which makes its oscillator strength very small, approximately $10^4$ times weaker than for excitation resonant with the purely electronic f-f transitions.

Exemplary Materials for Achieving PA in Nanoparticles

PA was first observed at low temperatures—and this can often be the case—though there have now been a fair amount of room temperature demonstrations in bulk systems. (See e.g., references 5-7, 18, and 51-55). In nanomaterials, however, the sensitivity of $Ln^{3+}$ photophysics to local material properties can preclude the realization of PA and can hinder room temperature operation.

As noted in the main text, four key innovations were combined to design nanocrystals that can be capable of PA. The first can be the recent design paradigm for $Ln^{3+}$-based upconverting nanoparticles ("UCNPs"), in which high $Ln^{3+}$ content, engineered energy confinement, and reduced surface losses result in exceptional efficiencies and brightness. (See, e.g., References 23, 29, 33-37, and 56). A second feature can be the choice of $Tm^{3+}$ (e.g., FIG. 1A), an ion with a particularly slow intermediate-state decay rate $W_2$, which can influence PA behavior. (See, e.g., References 5-7). The third critical aspect exploits the compositional strategy employed previously for energy looping nanoparticles ("ELNPs") (see, e.g., Reference 22), in which typical $Yb^{3+}$ sensitizers can be omitted and high concentrations of $Tm^{3+}$ ions can be doped into a β-phase $NaYF_4$ matrix, enhancing $Tm^{3+}$-$Tm^{3+}$ cross-relaxation and ESA while reducing GSA. (See e.g., FIG. 1). The fourth key element, also shared with ELNPs, can be the selection of excitation wavelengths in the NIR-II transparency window (e.g., either 1064 nm or 1450 nm; FIG. 1), which can be optimized for resonant ESA while maintaining non-resonant GSA, in contrast to the usual wavelengths used for pumping Tm3+(e.g., 800 nm, or 980 nm when combined with Yb3+ sensitization; FIG. 1). (See, e.g., References 6, 11, 12, 21, and 38).

To determine if these design criteria enable nanocrystals to host PA, $Tm^{3+}$-doped β-$NaYF_4$ core/shell structures 16-33 nm in total diameter were synthesized. (See, e.g., References 29 and 33). As described in synthesis and shell growth sections above, the $Tm^{3+}$-doped core in each ANP can be surrounded by an optically inert shell to minimize surface losses (see, e.g., Reference 33). (See e.g., FIGS. 1, 5, and 6, and Tables 1 and 2). These nanoparticles can be excited in the NIR-II region to emit in the NIR-I region at 800 nm. (See, e.g., Reference 22). Both spectral windows can be valuable for imaging with limited photodamage through living systems or scattering media. (See, e.g., Reference 57). More generally, the NIR operation and exceptional photostability, along with an exemplary combination of steep nonlinearity and efficiency offered by PA, suggest their utility in a diverse array of applications including sub-wavelength bioimaging (see, e.g., References 7, 11, and 12), photonics and light detection (see, e.g., References 56-58), temperature (see, e.g., References 13, 14, and 59) and pressure (see, e.g., Reference 15) transduction, neuromorphic computing (see, e.g., Reference 60), and quantum optics. (See, e.g., References 61 and 62).

Exemplary Differential Rate Equation Modeling of Photon Avalanching Behavior in ANPs Differential Rate equation ("DRE") modelling of the $Tm^{3+}$ doped system was performed based on the 3-level system. (See, e.g., Reference 1). The integrated rate equations can be expressed as:

$$\frac{dn_3}{dt} = \sigma^{ESA}\frac{I_p}{h\nu}n_2 - (W_3^R + W_3^{NR})n_3 - s_{31}n_3n_1 + Q_{23}n_2^2 \quad (2)$$

$$\frac{dn_2}{dt} = \sigma^{GSA}\frac{I_p}{h\nu}n_1 - \sigma^{ESA}\frac{I_p}{h\nu}n_2 - (W_2^R + W_2^{NR})n_2 + (b_{32}W_3^R + W_3^{NR})n_3 + 2s_{31}n_3n_1 - (Q_{22} + 2Q_{23})n_2^2 \quad (3)$$

$$n_1 + n_2 + n_3 = 1 \quad (4)$$

These equations may involve the ground-state and excited-state absorption coefficients $\sigma^{GSA}$ and $\sigma^{ESA}$, radiative and non-radiative relaxation rates $$W_i^R \text{ and } W_i^{NR}$$

of level i (e.g., excluding cross-relaxation), the branching ratio $b_{32}$, (e.g., the sum of radiative relaxation rates from the $^3H_4$ level to intermediate levels divided by $$W_3^R),$$

and the cross-relaxation rate $s_{31}$. In addition, to consider the inverse process of the $s_{31}$ cross relaxation, an inverse process of the cross relaxation (e.g., $^3F_4+^3F_4\rightarrow^3H_6+^3H_4$) and an upconversion process (e.g., $^3F_4+^3F_4\rightarrow^3H_6+^3F_4$) can be considered by the $$Q_{22}n_2^2 \text{ and } Q_{23}n_2^2$$

terms, as in the model by S. Guy and F. Joubert.[2] The populations $n_i$ of level i at steady state can be derived by solving the integrated rate equation with the Runge-Kutta $4^{th}$ order method.

The radiative relaxation rates can be calculated using crystal Judd-Ofelt parameters for β-$NaGdF_4$:$Tm^{3+}$ which can have comparable lattice phonon energy[3], and reduced matrix elements for $Tm^{3+}$ ions (e.g., Table 5)[4]. The parameters that can be related to energy transfer between $Tm^{3+}$ ions as a function of dopant concentration c can be expressed as, for example:

$$s_{31} = a_{cr}c^2 \quad (5)$$

$$Q_{22} = a_{inv}\frac{c^3}{c^2 + 4.3^2} \quad (6)$$

$$Q_{23} = a_{uc}\frac{c^3}{c^2 + 4.3^2} \quad (7)$$

whereas $$\sigma^{ESA}, W_2^{NR}, W_3^{NR}, a_{cr}, a_{inv},$$

and $a_{uc}$ can be derived from the fitting of simulation results to experimental data as shown in Tables 4 and 5. The nonradiative relaxation.

$$W_3^{NR}$$

can be approximately twice as high as $$W_2^{NR},$$

which seems reasonable considering the fact that the energy gap between the $^3F_4$ and $^3H_6$ level (e.g., approximately 4300 $cm^{-1}$) can be somewhat smaller than that between the $^3H_4$ and $^3H_5$ levels (e.g., approximately 5700 $cm^{-1}$). This model assumed $$W_2^{NR} \text{ and } W_3^{NR}$$

can be negligible for sample No. 5 because multiphonon relaxation rates of $Ln^{3+}$ ions in $LaF_3$ at the $^3H_4$ and $^3F_4$ levels can be calculated to be at least 4 order of magnitude smaller than other parameters,[7,8] and the shell thickness of sample No. 5 can be over 6 nm, which was reported to be thick enough to prevent surface quenching.[9]

The result shows that the ratio of the ESA to GSA rates can be 10667, above 10000, a criterion for a clear avalanche threshold[10]. This high contrast of The ESA rate can be 1.83 times higher than that for $Tm^{3+}$ doped silica fiber (e.g., Table 6). (See, e.g., Reference 11). That could be explained by, e.g., the phonon energy difference of the host lattices, along with linewidth narrowing. The coefficients of energy transfer between ions can be estimated at approximately 10% of those measure in YAG[5]. The decreases can also be attributed to the differences in phonon-assisted energy transfer depending on the host lattices, which has been shown by F. Auzel and F. Pelle[12]. The narrowing of absorption linewidths decreases the overlap of donor emission spectrum and acceptor absorption spectrum which reduces cross-relaxation energy transfer.

Exemplary Calculating Excited State Absorption Cross-Sections

Absorption cross sections (e.g., $\sigma_{int,ESA}$), integrated over the entire ESA peak, can be calculated from Judd-Ofelt theory using the methods described in a recent review[13]. The ESA cross section $\sigma_{ESA}(\bar{v})$ at a given excitation wavenumber $(\bar{v})$ can be calculated by assuming that the ESA absorption peak can have a Gaussian lineshape with variance w2 $(w=FWHM/(2\sqrt{\ln(2)}))$.

Exemplary Calculation of Quantum Yield

Exemplary theoretical quantum yield ("QY") for the $^3H_4 \rightarrow {}^3H_6$ transition (e.g., 800 nm) can be calculated by using the results from the DRE simulation. The equation can be expressed as:

$$QY = \frac{\#\text{photons emitted}}{\#\text{photons absorbed}} = \frac{(1-b_{32})W_3^R n_3}{\sigma^{GSA}\frac{I_P}{h\nu}n_1 + \sigma^{ESA}\frac{I_P}{h\nu}n_2} \tag{8}$$

(hν=pump photon energy)

Bulk materials other than $NaYF_4$ have hosted photon avalanching, which suggests that there can be opportunities to develop an entire class of PA probes for imaging and sensing. This can be possible with both other dopants (e.g., Pr3+, Ho3+, Er3+ also possibly co-doped with Yb3+) and other crystalline host materials (e.g., (Li/K)(Y/Gd/Lu)F4, (La/Ce)(Cl/B)3, CdF2, Y2O3, YAG, YAlO3, LnVO4) or even heavy glasses (e.g., ZBLAN)15. Therefore, the demarcated for PA in nanoparticles (e.g., using PA preconditioning, lack of sensitizer, and surface passivation) can facilitate the design of a variety of PA wavelengths and their further biomedical and technological applications.

In general, the same factors that promote photon avalanche can encourage high nonlinearities, such as a high ESA/GSA ratio, high cross-relaxation and energy transfer rates relative to other relaxation pathways, as well as emission branching ratios. Notably, the phonon energy and density of states, and thus crystalline structure of the host also plays a role in the efficiency of the phonon-assisted GSA and CR. Reducing the phonon energy of a host can proportionally increase the number of phonons utilized to bridge energy gaps between excitation radiation and GSA transition energies, and, according to the Energy Gap Law, exponentially decrease GSA transition rates.

The exemplary system, method and computer-accessible medium, according to an exemplary embodiments of the present disclosure, can provide a method to design a library of lanthanide-doped photon avalanche nanoparticles. The CR rate $s_{31}$ and relaxation rate $W_2$ can be fine-tuned by varying the $Ln^{3+}$ concentration and by surface passivation, respectively. For larger variations in composition, many material parameters can be interdependent, which can complicate predictions of the optimal materials for PA. Crystal structure can determine both site symmetry and phonon energies. Meanwhile changing dopant type results in different transition energies, cross-relaxation rates, and relaxation rates. Thus, in the future, high-throughput rate equation simulations that account for the above factors can be considered for rapidly screening the many combinations of material parameters for PA behavior.

Exemplary PASSI Simulations of Raster Scanned Confocal Imaging

For the sake of simplicity, but without any limitations, a Gaussian beam was used in all simulations. The Gaussian spot's FWHM can be established with a diffraction limit equation for pump beam $\lambda_P$=1064 nm and microscope objective NA=1.49 (e.g., to match experimental parameters). The definition of the beam was described by the equation S7.

$$I_G(x, y, x_o, y_o, I_0, \lambda) = I_0 \cdot \exp\left(-\frac{(x-x_o)^2 + (y-y_o)^2}{\omega^2}\right), \quad \text{where } \omega = \frac{\lambda}{2 \cdot NA} \tag{9}$$

This $I_G$ beam was scanned, by changing the position of the center $(x_o, y_o)$ over either a single or a collection of 19.5×16 nm large homogenous ANPs, defined by a binary image TabNP (x, y) (0=no particle, 1=particle). The size of TabNP image defined the size of ultimate image, where each pixel corresponded to 1 nm in 2D space. The $I_0$ was determined from the experimental "S" curves from FIG. 3.

By multiplying the $I_G$ by TabNP, a new table can be created that represents the excitation intensity at the location of the NP.

$$I_P(x_o, y_o) = TabNP(x, y) \cdot I_G(x, y, x_o, y_o, I_0, 1064) \tag{10}$$

The experimental "S" shaped dependence between pump and emission intensities was used in the simulations $((I_{EMI}=\text{fun}(I_P))$, and emission intensity at the position of the Gaussian excitation beam $(x_o, y_o)$ was calculated (e.g., FIG. 4) by summing the contribution of every non-zero pixel from such emission image at this $(x_o, y_o)$ position $$I_L(x_o, y_0) = \Sigma_{x_o}\Sigma_{y_o} I_{EMI}(I_P(x_o, y_o)) \tag{11}$$

Exemplary Multi-Point Excitation PASSI Parallel Imaging

The simulations of multi-point excitation PASSI parallel imaging were performed in a very similar way, with some modifications to emulate detection combined with photon localization analysis. Briefly, a hexagonal pattern of Gaussian beams was generated. (See e.g., FIG. 13). Independently, a phantom sample was designed as previously by using 2000×2000 binary empty image, with '1' indicating the position of an ANP. A spiral pattern of ANPs (see e.g., FIG. 13) was created, because this nicely shows the behavior of PASSI imaging versus distance between the ANPs under diffraction-limited optical resolution conditions. As previously, both the excitation pattern and phantom table were multiplied, which generated a new image, in which the pixel intensities indicated pump intensity.

At this point, these data were treated in a different way as compared to raster scanned imaging. Use of a 2D photodetector (e.g., a 2D pixel array) was assumed. Thus, every nanoparticle, excited with local pump intensity $I_P$, became a source of a new diffraction limited Gaussian spot, whose luminescence intensity $I_o$ was determined by the experimental “S” shaped power dependence, and FWHM was calculated for emission wavelength (e.g., X=800 nm). These diffraction limited spots were cumulated on a virtual CCD imager. Due to the very steep power dependence of ANPs, the hexagonal beam excitation pattern stimulated reasonable avalanche luminescence only from those ANPs that were matching exact centers of excitation beams (e.g., green spots in FIG. 13A).

By then adopting the photon localization method and searching for local maxima, the positions of individual ANPs can be determined accurately. By shifting the hexagonal pattern (e.g., FIG. 14A) in X and Y directions by a pattern period divided by 5, 5×5=25 luminescence images were acquired (e.g., FIG. 14B) and treated with the above-mentioned localization method. The localized ANP information was cumulated from all the 25 emission frames using amplitudes of emission (e.g., FIG. 14C). The simulated image of multiple ANPs using a hexagonal multi-point excitation pattern confirms the capability of ANPs to be distinguished at particle separation distances around 80 nm.

Exemplary Comparisons of (i) ANPs with Nonlinear Responses in Other Ln-Based Nanomaterials and (ii) PASSI with Other Superresolution Methods Photon avalanching materials were originally developed within the context of realizing new (e.g., efficient) lasers, and a number of successful demonstrations exist in literature. These bulk-material based PA results have been reviewed elsewhere. (See, e.g., References 1 and 2). As one can note, there can be many claims for PA (e.g., as slopes can be higher than 4 and simple ESA/ETU may not be enough to explain the UC process), but many can be unjustified as PA occurs when a few conditions can be satisfied simultaneously, for example, quasi linear power dependence below threshold AND saturation of luminescence at high pumping power and very high slopes (e.g., >10) above threshold AND power dependent slow rise times.

FIG. 18 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 1805. Such processing/computing arrangement 1805 can be, for example entirely or a part of, or include, but not limited to, a computer/processor 1810 that can include, for example one or more microprocessors, and use instructions stored on a computer-accessible medium (e.g., RAM, ROM, hard drive, or other storage device).

As shown in FIG. 18, for example a computer-accessible medium 1815 (e.g., as described herein above, a storage device such as a hard disk, floppy disk, memory stick, CD-ROM, RAM, ROM, etc., or a collection thereof) can be provided (e.g., in communication with the processing arrangement 1805). The computer-accessible medium 1815 can contain executable instructions 1820 thereon. In addition or alternatively, a storage arrangement 1825 can be provided separately from the computer-accessible medium 1815, which can provide the instructions to the processing arrangement 1805 so as to configure the processing arrangement to execute certain exemplary procedures, processes, and methods, as described herein above, for example.

Further, the exemplary processing arrangement 1805 can be provided with or include an input/output ports 1835, which can include, for example a wired network, a wireless network, the internet, an intranet, a data collection probe, a sensor, etc. As shown in FIG. 18, the exemplary processing arrangement 1805 can be in communication with an exemplary display arrangement 1830, which, according to certain exemplary embodiments of the present disclosure, can be a touch-screen configured for inputting information to the processing arrangement in addition to outputting information from the processing arrangement, for example. Further, the exemplary display arrangement 1830 and/or a storage arrangement 1825 can be used to display and/or store data in a user-accessible format and/or user-readable format.

The foregoing merely illustrates the principles of the disclosure. Various modifications and alterations to the described embodiments can be apparent to those skilled in the art in view of the teachings herein. It can thus be appreciated that those skilled in the art can be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as can be understood by those having ordinary skill in the art. In addition, certain terms used in the present disclosure, including the specification, drawings and claims thereof, can be used synonymously in certain instances, including, but not limited to, for example, data and information. It can be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it can be explicitly incorporated herein in its entirety. All publications referenced can be incorporated herein by reference in their entireties.

Exemplary Tables

TABLE 1

The average core diameters and shell thicknesses of $NaYF_4$: 1-100% $Tm^{3+}$@ $NaY_{0.8}Gd_{0.2}F_4$ core-shell nanocrystals

| Sample No. | Tm concentration | Core diameter | Shell thickness |
|---|---|---|---|
| 1 | 1% | 15.8 ± 1.5 nm | 3.0 ± 1.2 nm |
| 2 | 4% | 14.1 ± 1.5 nm | 3.8 ± 1.0 nm |
| 3 | 8% | 10.2 ± 1.1 nm | 4.0 ± 0.8 nm |
| 4 | 8% | 17.3 ± 0.8 nm | 5.6 ± 0.9 nm |
| 5 | 8% | 15.9 ± 1.0 nm | 8.5 ± 1.9 nm |
| 6 | 20% | 10.4 ± 1.0 nm | 2.7 ± 0.9 nm |
| 7 | 20% | 17.4 ± 0.8 nm | 2.6 ± 0.6 nm |
| 8 | 100% | 15.8 ± 1.3 nm | 4.2 ± 1.0 nm |

TABLE 2

The core sizes of nanoparticle samples with elliptical shapes

| Sample | Tm | Core diameter | | |
|---|---|---|---|---|
| No. | concentration | Major axis | Minor axis | Average |
| 1 | 1% | 17.3 ± 1.1 nm | 14.3 ± 1.3 nm | 15.8 ± 1.5 nm |
| 4 | 8% | 19.8 ± 0.8 nm | 15.1 ± 1.0 nm | 17.3 ± 0.8 nm |
| 5 | 8% | 17.5 ± 1.4 nm | 14.1 ± 1.3 nm | 15.9 ± 1.0 nm |
| 7 | 20% | 19.5 ± 1.0 nm | 15.5 ± 0.8 nm | 17.4 ± 0.8 nm |

TABLE 3

Photon avalanche threshold.

| Sample No. | $Tm^{3+}$ concentration (%) | Threshold (kW $cm^{-2}$) |
|---|---|---|
| 3 | 8 | 23.3 |
| 4 | 8 | 6.4 |
| 5 | 8 | 4.9 |
| 6 | 20 | 32.8 |

TABLE 3-continued

Photon avalanche threshold.

| Sample No. | $Tm^{3+}$ concentration (%) | Threshold (kW $cm^{-2}$) |
|---|---|---|
| 7 | 20 | 21.7 |
| 8 | 100 | 29.6 |

TABLE 4

Judd-Ofelt and relaxation parameters

| Parameter | Value |
|---|---|
| $\Omega_2$ ($10^{-2}$ $cm^2$) | 2.37 |
| $\Omega_4$ | 3.05 |
| $\Omega_6$ | 0.41 |
| $W_2^R$ ($s^{-1}$) | 162.60 |
| $W_3^R$ ($s^{-1}$) | 636.01 |
| $b_{32}$ | 0.144 |

TABLE 5

Reduced matrix elements for $Tm^{3+}$(ref. 4).

| Electronic Transition | $[U^{(2)}]^2$ | $[U^{(4)}]^2$ | $[U^{(6)}]^2$ |
|---|---|---|---|
| $^3H_6 \rightarrow {}^3F_4$ | 0.5395 | 0.7261 | 0.2421 |
| $\rightarrow {}^3H_5$ | 0.1074 | 0.2314 | 0.6385 |
| $\rightarrow {}^3H_4$ | 0.2357 | 0.1081 | 0.5916 |
| $^3F_4 \rightarrow {}^3H_5$ | 0.0909 | 0.1299 | 0.9264 |
| $\rightarrow {}^3H_4$ | 0.1275 | 0.1311 | 0.2113 |
| $^3H_5 \rightarrow {}^3H_4$ | 0.0131 | 0.4762 | 0.0095 |

TABLE 6

Derived absorption coefficients and coefficients for energy transfer between ions from curve-fitting

| Parameter | Value | |
|---|---|---|
| $\sigma^{GSA}$ ($\times 10^{-25}$ $m^2$) | $6.0 \times 10^{-4}$ | |
| $\sigma^{ESA}$ ($\times 10^{-25}$ $m^2$) | 6.4 | |
| $a_{cr}$ ($s^{-1}$) | 160 | c > 4% |
| | 49.7 | c = 4% |
| $a_{inv}$ ($s^{-1}$) | 25.6 | c > 4% |
| | 6.67 | c = 4% |
| $a_{uc}$ ($s^{-1}$) | 9.00 | c > 4% |
| | 2.35 | c = 4% |

TABLE 7

Derived phonon-assisted non-radiative relaxation rates from curve-fitting

| Parameter | Sample No. 2 | 3 | 4 | 5 | 6 | 7 | 8 |
|---|---|---|---|---|---|---|---|
| $W_2^{NR}$ ($s^{-1}$) | 56.9 | 512 | 40.7 | ~0 | 976 | 585 | 862 |
| $W_3^{NR}$ ($s^{-1}$) | 103.58 | 1030 | 87.3 | ~0 | 1957 | 1176 | 1730 |

TABLE 8

Phonon energy of host lattice and absorption cross section at 1064 nm

| Host lattice | Phonon energy ($cm^{-1}$) | Absorption cross section at 1064 nm, $\sigma^{ESA}$ ($\times 10^{-25}$ $m^2$) |
|---|---|---|
| β-$NaYF_4$ | ~360 | 6.4 (DRE model fit to data) |
| Silica fiber | ~1050 | 3.5 (from experiment[14]) |

TABLE 9

Increase in emission $\Delta_{av}$ when pump intensity can be increased from the avalanche threshold pump intensity $I_P^{th}$ to twice the threshold pump intensity $2I_P^{th}$.

| | Sample No. | Nanoparticle composition | $\Delta_{av} = I_E(2I_P^{th})/I_E(I_P^{th})$, experiment (800 nm emission) |
|---|---|---|---|
| FIG. 2A | 1 | 1% Tm (1064 nm) | 26 |
| | 2 | 4% Tm (1064 nm) | 34 |
| | 3 | 8% Tm (1064 nm) | 2029 |
| | 3 | 8% Tm (1450 nm) | 1025 |
| FIG. 3A | 3 | 8%, core/shell = 10/4.0 nm | 2029 |
| upper | 4 | 8%, core/shell = 17/5.6 nm | 1347 |
| panel | 5 | 8%, core/shell = 16/8.5 nm | 1190 |
| FIG. 3A | 3 | 8% Tm | 1347 |
| bottom | 7 | 20% Tm | 9691 |
| panel | 8 | 100% Tm | 491 |
| An additional sample | 6 | 20% Tm | 6142 |

TABLE 10

Exemplary Comparison of representative examples of energy-looping luminescence in Ln doped nanomaterials. $I_{TH}$, $I_{SAT}$, $S_{MAX}$, RT and $\tau_{90}$ respectively can denote excitation power threshold and saturation (if any provided), highest power dependence slope, presence of the clear PA features—power dependent risetimes ($\tau_R$) with the time required to get c.a. 90% of steady state emission ($\tau_{90}$); Legend: the ☒ symbols denote missing/unavailable information, ☑ denote the feature was observed but (possibly) no numerical values were provided/possible to extract; NC—nanocrystals; C@S denote core-shell NPs, where size or composition can differ between core and shell; $T_O$—operating temperature; RT—room temperature operation. The $I_{TH}$ and $I_{SAT}$ can be in [kW $cm^{-2}$], unless these numbers were provided in power units only.

| $Ln^{3+}$ | Host:dopant:size | $\lambda_{EXC}/\lambda_{EMT}$ [nm/nm] | $I_{TH}/I_{SAT}$ [kW $cm^{-2}$] | $S_{MAX}/\tau_R/\tau_{90}$ [n.a./n.a./s] | $T_O$ [° C.] | Additional comments | Refs. |
|---|---|---|---|---|---|---|---|
| Nd | 1% Nd/5% Yb YAG NC ceramics Size: ☒ | 976/597 | 400 mW/☒ | 5.4/☑/2 | RT | Hot emission proposed | 16 |

TABLE 10-continued

Exemplary Comparison of representative examples of energy-looping luminescence in Ln doped nanomaterials. $I_{TH}$, $I_{SAT}$, $S_{MAX}$, RT and $\tau_{90}$ respectively can denote excitation power threshold and saturation (if any provided), highest power dependence slope, presence of the clear PA features—power dependent risetimes ($\tau_R$) with the time required to get c.a. 90% of steady state emission ($\tau_{90}$); Legend: the ☒ symbols denote missing/unavailable information, ☑ denote the feature was observed but (possibly) no numerical values were provided/possible to extract; NC—nanocrystals; C@S denote core-shell NPs, where size or composition can differ between core and shell; $T_O$—operating temperature; RT—room temperature operation. The $I_{TH}$ and $I_{SAT}$ can be in [kW $cm^{-2}$], unless these numbers were provided in power units only.

| $Ln^{3+}$ | Host:dopant:size | $\lambda_{EXC}/\lambda_{EMT}$ [nm/nm] | $I_{TH}/I_{SAT}$ [kW $cm^{-2}$] | $S_{MAX}/\tau_R/\tau_{90}$ [n.a./n.a./s] | $T_O$ [° C.] | Additional comments | Refs. |
|---|---|---|---|---|---|---|---|
| Ce | $CeVO_4$ (nanoplates, nanowires, straw-sheaves) Size: 10 × 50 nm | 808/450-670 | ☒/☒ | 7.8 (straw-sheaves)/☒/☒ | ☒ | Larger microscale aggregates of nanoparticles; PA when strong cross-relaxation present in aggregates. | 17 |
| Nd | $NdVO_4$, (nanoplates, nanowires, straw-sheaves) Size: 10 × 50 nm | 808/500-650 | ☒/☒ | 14.1 (straw-sheaves)/☒/☒ | ☒ | Larger microscale aggregates of nanoparticles; PA when strong cross-relaxation present in aggregates. | 17 |
| Ce | $CeVO_4$, square plates size: 30 nm-40 nm | 800/593 | 23 mW/☒ | 15/☒/☒ | ☒ | Larger microscale aggregates of nanoparticles; PA when strong cross-relaxation present in aggregates. | 18 |
| Nd | $NdVO_4$ 30 nm wide, 6-8 nm longnm (like H letter) | 800 nm/584 nm | 8 mW/☒ | 22/☒/☒ | ☒ | Larger microscale aggregates of nanoparticles; PA when strong cross-relaxation present in aggregates. | 18 |
| Nd | $Nd_{0.1}Y_{0.9}VO_4$ $NdVO_4$ Size: 30 × 9 nm | 808/593, 535 | 90 mW/☒@593 nm 60 mW/☒@535 nm | 9.5 (@593 nm)/☒/☒ 6.7 (@535 nm)/☒/50 ns | ☒ | | 19 |
| Pr | Glass, glass ceramics, ceramics nanocrystals size: 25-50 nm (calculated from XRD) | 976/Vis | 1.7 mW/2.2 mW | 5.28 (@548 nm)/☒/☒ | ☒ | | 20 |
| Tm | $NaYF_4$:x%Tm20% Gd(x = 0.1 to 1.5) Size: 40 nm | 1064/800 | ~1.6 mW/ ~2.0 mW | 3.2/☒/☒ | ☒ | | 21 |
| Ho | $Ho^{3+}$-$Yb^{3+}$ co-doped glass-ceramics containing $CaF_2$ nanocrystals Size: 8, 10, 13, 18 nm | 745/545, 650 | 0.410/☒ | 3.1/☑/0.013 | RT | | 22 |
| Er | 5% ErYb $P_4O_{12}$ 5% $ErYbP_5O_{14}$ Size: 26-30 nm | 980/548, 650 | 1W/☒ 0.6W/☒ | 1.5-3.5 (@545); 1-4 (@654)/☒/☒ | ☒ | | 23 |
| Ho | $1Ho:Lu_3Ga_5O_{12}$ $1Ho:Y_3Ga_5O_{12}$ Size: 50-90 nm | 751/545 | 0.331/☒ 0.238/☒ | 2.54/☒/☒ 2.14/☒/☒ | ☒ | | 24 |
| Tm | $NaYF_4$:20% $Gd^{3+}$, 0.1-1.5 %$Tm^{3+}$ Size: 10 nm | 1064/800 | 0.4/0.5 | 3.2/☒/☒ | ☒ | | 25 |
| Ho | $Ho_{0.5}:Gd_2O_3$ $Ho_{0.5}:Yb_3:Gd_2O_3$ Annealed $Ho_{0.5}:Yb_3:Gd_2O_3$ Size: ~100 nm | 976/ 553, 669 | 150/350 mW | 4.8 @553, 4.5@669/☑/0.005@553 nm | ☒ | | 26 |
| Tm | Yb/Tm co-doped $NaYF_4$ UCNPs 20% Yb 0.5%-8% Tm Size: 40n m | 980, 980 + 808/455 | ☒/☒ | 3.13/☑/☒ | RT | | 27 |
| Er | $Gd_2O_{3-x}S_x$:Er Size: 7, 47 and 49 nm | 978/671, 549 0 | ☒/☒ | ☒/☑/☒ | ☒ | | 28 |
| Nd | $Nd^{3+}$ doped NPs: $NaYF_4$, $Y_2O_3$, $YGdO_3$, $YAlO_3$, $Y_3Al_5O_{12}$, $LiLaP_4O_{12}$, $Gd_2O_3$ Size: 10-20 nm | 1064/800 | 0.7 W at 10° C. in $LiLaP_4O_{12}:Nd^{3+}$ | ☒/☒/☒ | 10-200° C. | anti-Stokes avalanche-like NIR emission | 29 |
| Nd | in silico modelling of the PA in $Nd^{3+}$:NPs | 1064/800 | ☒/☒ | 10 (up to 80)/☑/☒ | RT | in silico modelling of the photon avalanche phenomenon for photon avalanche assisted single beam super-resolution imaging (PASSI) | 30 |
| Er | $BiOCl:Er^{3+}$ Nanosheets Size: 150, 70, 35 nm | 980/ 540, 650 | 0.085/☒ | 7.86 (red)/☒/☒ | ☒ | | 31 |
| Tm | $NaYF_4$: 20% Yb, 8% Tm Size: 46 nm | 976/455 | 100/250 | 6.2/☒/☒ | ☒ | super-linear emitters, 3D sub-diffraction imaging | 32 |

TABLE 10-continued

Exemplary Comparison of representative examples of energy-looping luminescence in Ln doped nanomaterials. $I_{TH}$, $I_{SAT}$, $S_{MAX}$, RT and $\tau_{90}$ respectively can denote excitation power threshold and saturation (if any provided), highest power dependence slope, presence of the clear PA features—power dependent risetimes ($\tau_R$) with the time required to get c.a. 90% of steady state emission ($\tau_{90}$); Legend: the ☒ symbols denote missing/unavailable information, ☑ denote the feature was observed but (possibly) no numerical values were provided/possible to extract; NC—nanocrystals; C@S denote core-shell NPs, where size or composition can differ between core and shell; $T_O$—operating temperature; RT—room temperature operation. The $I_{TH}$ and $I_{SAT}$ can be in [kW $cm^{-2}$], unless these numbers were provided in power units only.

| $Ln^{3+}$ | Host:dopant:size | $\lambda_{EXC}/\lambda_{EMT}$ [nm/nm] | $I_{TH}/I_{SAT}$ [kW $cm^{-2}$] | $S_{MAX}/\tau_R/\tau_{90}$ [n.a./n.a./s] | $T_O$ [° C.] | Additional comments | Refs. |
|---|---|---|---|---|---|---|---|
| Tm | $NaYF_4$: 20% Yb, 8% Tm<br>Size: 46 nm | 976 (exc) + 808 (dep)/455 | N/A/550 | 6.4/☒/☒ | ☒ | Simultaneous super-linear excitation-emission and emission depletion | 33 |
| Tm | $NaYF_4$: 20% $Yb^{3+}$, x% $Tm^{3+}$<br>NPs, x = 0.5-8<br>$NaYF_4$: x% $Yb^{3+}$, 4% $Tm^{3+}$<br>NPs, x = 20-80<br>Size: ~20 nm | 976/800 | 1-1000/<br>100-10000 | ☑/☒/☒ | ☒ | Upconversion Nonlinear Structured Illumination Microscopy | 34 |
| Tm | [β-$NaYF_4$ @ β-$NaYF_4$<br>>8% Tm @ . . .<br>Size: 17@5.6 nm | 1064/800;<br>1450/800 | 6/8<br>35/45 | Photon avalanching<br>26/☑/0.6<br>14.3/☒/☒ | RT<br>RT | $I_{TH}$, $S_{MAX}$ varied with dopant concentration, shell thickness and $\lambda_{EXC}$; First demo of super-resolution imaging with PASSI | This work |

TABLE 11

Overview of superresolution microscopy techniques including PASSI.
$: low cost, $$: Moderate cost, $$$: High cost, ✓: yes/possible, SR-SIM: super-resolution structured illumination microscopy,

| Method | | Principle: detector | 3D res:/ stack | 2-color/ multi-color | Live cell | Ease of use | Costs | Sample prep. | Thick >20 μm | Localization or resolution Improvement | Noadditional computation/ post-processing requirements | Refs. |
|---|---|---|---|---|---|---|---|---|---|---|---|---|
| SR-SIM | Re-scan | Single-point scanning: camera | —/√ | √/√ | √ | Easy | $ | Easy | √ | Low | — | 36 |
| | Airyscan | Single-point scanning: Photo-detector array | √/√ | √/√ | √ | Easy | $$ | Easy | √ | Low | — | 37-39 |
| | iSIM | Multi-point scanning: camera | √/√ | √/√ | √ | Easy | $$ | Easy | √ | Low | — | 39, 40 |
| | Interference-based 2D/3D SIM | Wide-field (TIRF); camera | √/√ | √/√ | √ | Moderate | $$$ | Moderate | - | Moderate | — | 41-44 |
| STED | | Point scanning: Photo-detector | √/√ | √/— | —/√ | Moderate | $$$/$ | Easy | √ | High | √ | 45 |
| RESOLFT | | STED, SIM | √/— | —/— | √ | Moderate | $$$ | Difficult | — | High | √ | 44, 46, 47 |
| SM/LM | | Wide-field, TIRF, HILO; camera | √/— | √/— | — | Moderate | $$ | Difficult | — | High | — | 48, 49 |
| SOFI/SRRF | | Algorithm | √ | √/— | √ | Moderate | $ | Moderate | — | Moderate | — | 50, 51 |
| LLS | | Light-sheet and SIM; camera | √ | √/— | √ | Difficult | $$$ | Moderate | √ | Low | √ | 52 |
| ExM | | Sample prep. kit | √ | √/√ | — | Easy | $-$$ | Moderate | √ | High | √ | 53-55 |

TABLE 11-continued

Overview of superresolution microscopy techniques including PASSI.
$: low cost, $$: Moderate cost, $$$: High cost, ✓: yes/possible, SR-SIM: super-resolution structured illumination microscopy,

| Method | Principle: detector | 3D res:/ stack | 2-color/ multi-color | Live cell | Ease of use | Costs | Sample prep. | Thick >20 μm | Localization or resolution Improvement | Noadditional computation/ post-processing requirements | Refs. |
|---|---|---|---|---|---|---|---|---|---|---|---|
| PASSI/uSEE | Point scanning: Photo-detector/ Multi-point scanning; camera | √/√ | —/— | √(?) | Easy | $ | Easy | √ | High | √ | 30, 32, This work |

iSIM: instant structured illumination microscopy,
STED: stimulated emission depletion microscopy,
RESOLFT: reversible, saturable optical linear fluorescence transitions,
SMLM: single-molecule localization microscopy,
SOFI: super-resolution optical fluctuation imaging,
SRRF: super-resolution ring correlation,
LLS: lattice light sheet,
ExM: expansion microscopy,
PASSI: photon avalanche single beam super-resolution imaging,
uSEE: super-linear excitation-emission.

EXEMPLARY REFERENCES

The following references are hereby incorporated by reference, in their entireties:

1. Turcotte, D. L. Self-organized criticality. Rep. Prog. Phys. 62, 1377-1429 (1999).
2. Ni, H. & Rand, S. C. Avalanche phase conjugation. Opt. Lett. 17, 1222-1224 (1992).
3. Chivian, J. S., Case, W. E. & Eden, D. D. The photon avalanche: A new phenomenon in Pr3+-based infrared quantum counters. Appl. Phys. Lett. 35, 124-125 (1979).
4. Lenth, W. & Macfarlane, R. M. Excitation mechanisms for upconversion lasers. J. Lumin. 45, 346-350 (1990).
5. Joubert, M.-F. Photon avalanche upconversion in rare earth laser materials. Optical Materials 11, 181-203 (1999).
6. Auzel, F. Upconversion and Anti-Stokes Processes with f and d Ions in Solids. Chemical Reviews 104, 139-174 (2004).
7. Bednarkiewicz, A., Chan, E. M., Kotulska, A., Marciniak, L. & Prorok, K. Photon avalanche in lanthanide doped nanoparticles for biomedical applications: super-resolution imaging. Nanoscale Horizons 4, 881-889 (2019).
8. Thompson, M. A., Lew, M. D. & Moerner, W. E. Extending Microscopic Resolution with Single-Molecule Imaging and Active Control. Annual Review of Biophysics 41, 321-342 (2012).
9. Gustafsson, M. G. L. Nonlinear structured-illumination microscopy: Wide-field fluorescence imaging with theoretically unlimited resolution. Proceedings of the National Academy of Sciences of the United States of America 102, 13081 (2005).
10. Heintzmann, R. & Huser, T. Super-Resolution Structured Illumination Microscopy. Chemical Reviews 117, 13890-13908 (2017).
11. Denkova, D., Ploschner, M., Das, M., Parker, L. M., Zheng, X., Lu, Y., Orth, A., Packer, N. H. & Piper, J. A. 3D sub-diffraction imaging in a conventional confocal configuration by exploiting super-linear emitters. Nat. Commun. 10, 3695 (2019).
12. Liu, Y., Wang, F., Lu, H., Fang, G., Wen, S., Chen, C., Shan, X., Xu, X., Zhang, L., Stenzel, M. & Jin, D. Super-Resolution Mapping of Single Nanoparticles inside Tumor Spheroids. Small 16, 1905572 (2020).
13. Marciniak, L., Bednarkiewicz, A. & Elzbieciak, K. NIR-NIR photon avalanche based luminescent thermometry with Nd3+ doped nanoparticles. Journal of Materials Chemistry C 6, 7568-7575 (2018).
14. Pickel, A. D., Teitelboim, A., Chan, E. M., Borys, N. J., Schuck, P. J. & Dames, C. Apparent self-heating of individual upconverting nanoparticle thermometers. Nat. Commun. 9, 4907 (2018).
15. Lay, A., Sheppard, 0. H., Siefe, C., McLellan, C. A., Mehlenbacher, R. D., Fischer, S., Goodman, M. B. & Dionne, J. A. Optically Robust and Biocompatible Mechanosensitive Upconverting Nanoparticles. ACS Central Science 5, 1211-1222 (2019).
16. Xie, P. & Gosnell, T. R. Room-temperature upconversion fiber laser tunable in the red, orange, green, and blue spectral regions. Opt. Lett. 20, 1014-1016 (1995).
17. Guy, S., Joubert, M. F. & Jacquier, B. Photon avalanche and the mean-field approximation. Phys. Rev. B 55, 8240-8248 (1997).
18. Deng, H., Yang, S., Xiao, S., Gong, H.-M. & Wang, Q.-Q. Controlled Synthesis and Upconverted Avalanche Luminescence of Cerium (III) and Neodymium (III) Orthovanadate Nanocrystals with High Uniformity of Size and Shape. Journal of the American Chemical Society 130, 2032-2040 (2008).
19. Wang, Q.-Q., Han, J.-B., Guo, D.-L., Xiao, S., Han, Y.-B., Gong, H.-M. & Zou, X.-W. Highly Efficient Avalanche Multiphoton Luminescence from Coupled Au Nanowires in the Visible Region. Nano Lett. 7, 723-728 (2007).
20. Ma, Z., Yu, Y., Shen, S., Dai, H., Yao, L., Han, Y., Wang, X., Han, J.-B. & Li, L. Origin of the Avalanche-Like Photoluminescence from Metallic Nanowires. Scientific Reports 6, 18857 (2016).
21. Liu, Y., Lu, Y., Yang, X., Zheng, X., Wen, S., Wang, F., Vidal, X., Zhao, J., Liu, D., Zhou, Z., Ma, C., Zhou, J., Piper, J. A., Xi, P. & Jin, D. Amplified stimulated emission in upconversion nanoparticles for super-resolution nanoscopy. Nature 543, 229-233 (2017).

22. Levy, E. S., Tajon, C. A., Bischof, T. S., Iafrati, J., Fernandez-Bravo, A., Garfield, D. J., Chamanzar, M., Maharbiz, M. M., Sohal, V. S., Schuck, P. J., Cohen, B. E. & Chan, E. M. Energy-Looping Nanoparticles: Harnessing Excited-State Absorption for Deep-Tissue Imaging. ACS Nano 10, 8423-8433 (2016).
23. Fernandez-Bravo, A., Yao, K., Barnard, E. S., Borys, N. J., Levy, E. S., Tian, B., Tajon, C. A., Moretti, L., Altoe, M. V., Aloni, S., Beketayev, K., Scotognella, F., Cohen, B. E., Chan, E. M. & Schuck, P. J. Continuous-wave upconverting nanoparticle microlasers. Nat. Nanotechnol. 13, 572-577 (2018).
24. Si, X., Li, Z., Qu-Quan, W., Hong, D. & Shi-He, Y. Energy Transfer and Avalanche Upconversion of Nd x Y 1-x VO 4 Nanocrystals. Chin. Phys. Lett. 26, 124209 (2009).
25. Bednarkiewicz, A. & Strek, W. Laser-induced hot emission in Nd3/Yb3: YAG nanocrystallite ceramics. J. Phys. D: Appl. Phys. 35, 2503-2507 (2002).
26. Dwivedi, Y., Bahadur, A. & Rai, S. B. Optical avalanche in Ho:Yb:Gd2O3 nanocrystals. J. Appl. Phys. 110, 043103 (2011).
27. Wang, G., Peng, Q. & Li, Y. Luminescence Tuning of Upconversion Nanocrystals. Chemistry-A European Journal 16, 4923-4931 (2010).
28. Zhou, B., Shi, B., Jin, D. & Liu, X. Controlling upconversion nanocrystals for emerging applications. Nat. Nanotechnol. 10, 924-936 (2015).
29. Tian, B., Fernandez-Bravo, A., Najafiaghdam, H., Torquato, N. A., Altoe, M. V. P., Teitelboim, A., Tajon, C. A., Tian, Y., Borys, N. J., Barnard, E. S., Anwar, M., Chan, E. M., Schuck, P. J. & Cohen, B. E. Low irradiance multiphoton imaging with alloyed lanthanide nanocrystals. Nat. Commun. 9, 3082 (2018).
30. Tajon, C. A., Yang, H., Tian, B., Tian, Y., Ercius, P., Schuck, P. J., Chan, E. M. & Cohen, B. E. Photostable and efficient upconverting nanocrystal-based chemical sensors. Optical Materials 84, 345-353 (2018).
31. Bünzli, J.-C. G. & Piguet, C. Taking advantage of luminescent lanthanide ions. Chem. Soc. Rev. 34, 1048-1077 (2005).
32. Gnach, A., Lipinski, T., Bednarkiewicz, A., Rybka, J. & Capobianco, J. A. Upconverting nanoparticles: assessing the toxicity. Chem. Soc. Rev. 44, 1561-1584 (2015).
33. Gargas, D. J., Chan, E. M., Ostrowski, A. D., Aloni, S., Altoe, M. V. P., Barnard, E. S., Sanii, B., Urban, J. J., Milliron, D. J., Cohen, B. E. & Schuck, P. J. Engineering bright sub-10-nm upconverting nanocrystals for single-molecule imaging. Nat. Nanotechnol. 9, 300 (2014).
34. Fischer, S., Bronstein, N. D., Swabeck, J. K., Chan, E. M. & Alivisatos, A. P. Precise Tuning of Surface Quenching for Luminescence Enhancement in Core-Shell Lanthanide-Doped Nanocrystals. Nano Lett. 16, 7241-7247 (2016).
35. Johnson, N. J. J., He, S., Diao, S., Chan, E. M., Dai, H. & Almutairi, A. Direct Evidence for Coupled Surface and Concentration Quenching Dynamics in Lanthanide-Doped Nanocrystals. Journal of the American Chemical Society 139, 3275-3282 (2017).
36. Liu, Q., Zhang, Y., Peng, C. S., Yang, T., Joubert, L.-M. & Chu, S. Single upconversion nanoparticle imaging at sub-10 W cm-2 irradiance. Nat. Photonics 12, 548-553 (2018).
37. Chen, X., Jin, L., Kong, W., Sun, T., Zhang, W., Liu, X., Fan, J., Yu, S. F. & Wang, F. Confining energy migration in upconversion nanoparticles towards deep ultraviolet lasing. Nat. Commun. 7, 10304 (2016).
38. Wang, F., Deng, R., Wang, J., Wang, Q., Han, Y., Zhu, H., Chen, X. & Liu, X. Tuning upconversion through energy migration in core-shell nanoparticles. Nat. Mater. 10, 968-973 (2011).
39. Gamelin, D. R., Lüthi, S. R. & Güdel, H. U. The Role of Laser Heating in the Intrinsic Optical Bistability of Yb3+-Doped Bromide Lattices. The Journal of Physical Chemistry B 104, 11045-11057 (2000).
40. Butcher, J. C. Numerical Methods for Ordinary Differential Equations. (Wiley, 2016).
41. Goldner, P. & Pelle, F. Photon avalanche fluorescence and lasers. Optical Materials 5, 239-249 (1996).
42. Joubert, M. F., Guy, S. & Jacquier, B. Model of the photon-avalanche effect. Phys. Rev. B 48, 10031-10037 (1993).
43. Hong, G., Diao, S., Chang, J., Antaris, A. L., Chen, C., Zhang, B., Zhao, S., Atochin, D. N., Huang, P. L., Andreasson, K. I., Kuo, C. J. & Dai, H. Through-skull fluorescence imaging of the brain in a new near-infrared window. Nat. Photonics 8, 723-730 (2014).
44. Ostrowski, A. D., Chan, E. M., Gargas, D. J., Katz, E. M., Han, G., Schuck, P. J., Milliron, D. J. & Cohen, B. E. Controlled Synthesis and Single-Particle Imaging of Bright, Sub-10 nm Lanthanide-Doped Upconverting Nanocrystals. ACS Nano 6, 2686-2692 (2012).
45. Hossan, M. Y., Hor, A., Luu, Q., Smith, S. J., May, P. S. & Berry, M. T. Explaining the Nanoscale Effect in the Upconversion Dynamics of β-$NaYF_4$:Yb3+, Er3+ Core and Core-Shell Nanocrystals. The Journal of Physical Chemistry C 121, 16592-16606 (2017).
46. Teitelboim, A., Tian, B., Garfield, D. J., Fernandez-Bravo, A., Gotlin, A. C., Schuck, P. J., Cohen, B. E. & Chan, E. M. Energy Transfer Networks within Upconverting Nanoparticles Are Complex Systems with Collective, Robust, and History-Dependent Dynamics. The Journal of Physical Chemistry C 123, 2678-2689 (2019).
47. Chan, E. M., Gargas, D. J., Schuck, P. J. & Milliron, D. J. Concentrating and Recycling Energy in Lanthanide Codopants for Efficient and Spectrally Pure Emission: The Case of $NaYF_4$:Er3+/Tm3+Upconverting Nanocrystals. The Journal of Physical Chemistry B 116, 10561-10570 (2012).
48. Corle, T. R. & Kino, G., S. Confocal Scanning Optical Microscopy and Related Imaging Systems. (Academic Press, 1996).
49. Chen, C., Wang, F., Wen, S., Su, Q. P., Wu, M. C. L., Liu, Y., Wang, B., Li, D., Shan, X., Kianinia, M., Aharonovich, I., Toth, M., Jackson, S. P., Xi, P. & Jin, D. Multi-photon near-infrared emission saturation nanoscopy using upconversion nanoparticles. Nat. Commun. 9, 3290 (2018).
50. Pichaandi, J., Boyer, J.-C., Delaney, K. R. & van Veggel, F. C. J. M. Two-Photon Upconversion Laser (Scanning and Wide-Field) Microscopy Using Ln3+-Doped NaYF4 Upconverting Nanocrystals: A Critical Evaluation of their Performance and Potential in Bioimaging. The Journal of Physical Chemistry C 115, 19054-19064 (2011).
51. Auzel, F., Chen, Y. & Meichenin, D. Room temperature photon avalanche up-conversion in Er-doped ZBLAN glass. *J. Lumin.* 60-61, 692-694 (1994).
52. Auzel, F. & Chen, Y. Photon avalanche luminescence of $Er^{3+}$ ions in LiYF4 crystal. *J. Lumin.* 65, 45-56 (1995).
53. Gomes, A. S. L., Maciel, G. S., de Araújo, R. E., Acioli, L. H. & de Araújo, C. B. Diode pumped avalanche upconversion in $Pr^{3+}$-doped fibers. *Optics Communications* 103, 361-364 (1993).

54. Martin, I. R., Rodriguez, V. D., Guyot, Y., Guy, S., Boulon, G. & Joubert, M. F. Room temperature photon avalanche upconversion in $Tm^{3+}$-doped fluoroindate glasses. *J. Phys.: Condens. Matter* 12, 1507-1516 (2000).
55. Li, Y., Wang, T., Ren, W., Han, J., Yin, Z., Qiu, J., Yang, Z. & Song, Z. BiOCl:$Er^{3+}$ Nanosheets with Tunable Thickness for Photon Avalanche Phosphors. *ACS Applied Nano Materials* 2, 7652-7660 (2019).
56. Garfield, D. J., Borys, N. J., Hamed, S. M., Torquato, N. A., Tajon, C. A., Tian, B., Shevitski, B., Barnard, E. S., Suh, Y. D., Aloni, S., Neaton, J. B., Chan, E. M., Cohen, B. E. & Schuck, P. J. Enrichment of molecular antenna triplets amplifies upconverting nanoparticle emission. *Nat. Photonics* 12, 402-407 (2018).
57. Liu, Y., Teitelboim, A., Fernandez-Bravo, A., Yao, K., Altoe, M. V. P., Aloni, S., Zhang, C., Cohen, B. E., Schuck, P. J. & Chan, E. M. Controlled Assembly of Upconverting Nanoparticles for Low-Threshold Microlasers and Their Imaging in Scattering Media. *ACS Nano* 14, 1508-1519 (2020).
58. Fernandez-Bravo, A., Wang, D., Barnard, E. S., Teitelboim, A., Tajon, C., Guan, J., Schatz, G. C., Cohen, B. E., Chan, E. M., Schuck, P. J. & Odom, T. W. Ultralow-threshold, continuous-wave upconverting lasing from subwavelength plasmons. *Nat. Mater.* 18, 1172-1176 (2019).
59. Kilbane, J. D., Chan, E. M., Monachon, C., Borys, N. J., Levy, E. S., Pickel, A. D., Urban, J. J., Schuck, P. J. & Dames, C. Far-field optical nanothermometry using individual sub-50 nm upconverting nanoparticles. *Nanoscale* 8, 11611-11616 (2016).
60. Zhai, Y., Zhou, Y., Yang, X., Wang, F., Ye, W., Zhu, X., She, D., Lu, W. D. & Han, S.-T. Near infrared neuromorphic computing via upconversion-mediated optogenetics. *Nano Energy* 67, 104262 (2020).
61. Bradac, C., Johnsson, M. T., Breugel, M. v., Baragiola, B. Q., Martin, R., Juan, M. L., Brennen, G. K. & Volz, T. Room-temperature spontaneous superradiance from single diamond nanocrystals. *Nat. Commun.* 8, 1205 (2017).
62. Asenjo-Garcia, A., Kimble, H. J. & Chang, D. E. Optical waveguiding by atomic entanglement in multilevel atom arrays. *Proceedings of the National Academy of Sciences* 116, 25503 (2019).
63. Joubert, M.-F., Guy, S., Jacquier, B. & Linares, C. The photon-avalanche effect: review, model and application. *Optical Materials* 4, 43-49 (1994).
64. Guy, S., Joubert, M. & Jacquier, B. Photon avalanche and the mean-field approximation. *Physical Review B* 55, 8240 (1997).
65. Villanueva-Delgado, P., Biner, D. & Krämer, K. Judd-Ofelt analysis of $\beta$-$NaGdF_4$: Yb3+, Tm3+ and $\beta$-$NaGdF_4$: Er3+single crystals. *Journal of luminescence* 189, 84-90 (2017).
66. Carnall, W., Crosswhite, H. & Crosswhite, H. M. Energy level structure and transition probabilities in the spectra of the trivalent lanthanides in $LaF_3$. (Argonne National Lab. (ANL), Argonne, IL (United States), 1978).
67. Armagan, G., Buoncristiani, A. & Di Bartolo, B. Excited state dynamics of thulium ions in Yttrium Aluminum Garnets. *Optical Materials* 1, 11-20 (1992).
68. Shaw, L., Chang, R. & Djeu, N. Measurement of up-conversion energy-transfer probabilities in Ho: Y 3 Al 5 O 12 and Tm: Y 3 Al 5 O 12. *Physical Review B* 50, 6609 (1994).
69. Basiev, T., Orlovskii, Y. V., Pukhov, K. & Auzel, F. Multiphonon relaxation of the energy of electronic excitation in optical crystals doped with rare-earth ions. *Laser Physics* 7, 1139-1152 (1997).
70. Miyakawa, T. & Dexter, D. Phonon sidebands, multiphonon relaxation of excited states, and phonon-assisted energy transfer between ions in solids. *Physical Review B* 1, 2961 (1970).
71. Fischer, S., Bronstein, N. D., Swabeck, J. K., Chan, E. M. & Alivisatos, A. P. Precise tuning of surface quenching for luminescence enhancement in core-shell lanthanide-doped nanocrystals. *Nano letters* 16, 7241-7247 (2016).
72. Goldner, P. & Pelle, F. Photon avalanche fluorescence and lasers. Optical Materials 5, 239-249, doi:https://doi.org/10.1016/0925-3467(96)00003-1 (1996).
73. Peterka, P., Kasik, I., Dhar, A., Dussardier, B. & Blanc, W. Theoretical modeling of fiber laser at 810 nm based on thulium-doped silica fibers with enhanced 3 H 4 level lifetime. *Optics express* 19, 2773-2781 (2011).
74. Auzel, F. & Pellé, F. Bottleneck in multiphonon nonradiative transitions. *Physical Review B* 55, 11006 (1997).
75. Chan, E. M. Combinatorial approaches for developing upconverting nanomaterials: high-throughput screening, modeling, and applications. *Chem. Soc. Rev.* 44, 1653-1679, doi:10.1039/C4C500205A (2015).
76. Jackson, S. D. & King, T. A. Theoretical modeling of Tm-doped silica fiber lasers. *Journal of lightwave technology* 17, 948 (1999).
77. Joubert, M.-F. Photon avalanche upconversion in rare earth laser materials. *Optical Materials* 11, 181-203, doi:https://doi.org/10.1016/S0925-3467(98)00043-3 (1999).
78. Bednarkiewicz, A. & Strek, W. Laser-induced hot emission in Nd3+/Yb3+: YAG nanocrystallite ceramics. *Journal of Physics D: Applied Physics* 35, 2503 (2002).
79. Deng, H. et al. Additive-mediated splitting of lanthanide orthovanadate nanocrystals in water: morphological evolution from rods to sheaves and to spherulites. *Crystal Growth and Design* 8, 4432-4439 (2008).
80. Deng, H., Yang, S., Xiao, S., Gong, H.-M. & Wang, Q.-Q. Controlled synthesis and upconverted avalanche luminescence of cerium (III) and neodymium (III) orthovanadate nanocrystals with high uniformity of size and shape. *Journal of the American Chemical Society* 130, 2032-2040 (2008).
81. Si, X., Li, Z., Qu-Quan, W., Hong, D. & Shi-He, Y. Energy Transfer and Avalanche Upconversion of NdxYl-xVO4 Nanocrystals. *Chinese Physics Letters* 26, 124209 (2009).
82. Joshi, C. & Rai, S. Structural, thermal, and optical properties of Pr3+/Yb3+co-doped oxyhalide tellurite glasses and its nano-crystalline parts. *Solid state sciences* 14, 997-1003 (2012).
83. Joshi, C., Rai, R. & Rai, S. Structural, thermal, and optical properties of Er3+/Yb3+co-doped oxyhalide tellurite glasses, glass-ceramics and ceramics. *Journal of Quantitative Spectroscopy and Radiative Transfer* 113, 397-404 (2012).
84. Babu, P. et al. Photon avalanche upconversion in Ho3+-Yb3+co-doped transparent oxyfluoride glass-ceramics. *Chemical Physics Letters* 600, 34-37 (2014).
85. Marciniak, L., Stefanski, M., Tomala, R., Hreniak, D. & Strek, W. Synthesis and up-conversion luminescence of Er3+ and Y b3+codoped nanocrystalline tetra-(KLaP4O12) and pentaphosphates (LaP5O14). *The Journal of Chemical Physics* 143, 094701 (2015).
86. Rathaiah, M. et al. Photon avalanche upconversion in Ho3+-doped gallium nano-garnets. *Optical Materials* 39, 16-20 (2015).

87. Levy, E. S. et al. Energy-looping nanoparticles: harnessing excited-state absorption for deep-tissue imaging. *ACS nano* 10, 8423-8433 (2016).

88. Dwivedi, Y., Bahadur, A. & Rai, S. Optical avalanche in Ho:Yb:Gd2O3 nanocrystals. *Journal of Applied Physics* 110, 043103 (2011).

89. Liu, Y. et al. Amplified stimulated emission in upconversion nanoparticles for super-resolution nanoscopy. *Nature* 543, 229-233, doi:10.1038/nature21366 (2017).

90. Wang, F., Yang, B., Yu, Q., Liu, D. & Ma, W. Cooperative upconversion luminescence of Er3+ in Gd2O3-xSx phosphor. *Spectrochimica Acta Part A: Molecular and Biomolecular Spectroscopy* 190, 312-317 (2018).

91. Marciniak, L., Bednarkiewicz, A. & Elzbieciak, K. NIR-NIR photon avalanche based luminescent thermometry with Nd 3+ doped nanoparticles. *Journal of Materials Chemistry* C 6, 7568-7575 (2018).

92. Bednarkiewicz, A., Chan, E. M., Kotulska, A., Marciniak, L. & Prorok, K. Photon avalanche in lanthanide doped nanoparticles for biomedical applications: super-resolution imaging. *Nanoscale Horizons* 4, 881-889 (2019).

93. Li, Y. et al. BiOCl: Er3+nanosheets with tunable thickness for photon avalanche phosphors. *ACS Applied Nano Materials* 2, 7652-7660 (2019).

94. Denkova, D. et al. 3D sub-diffraction imaging in a conventional confocal configuration by exploiting super-linear emitters. *Nature communications* 10, 1-12 (2019).

95. Ploschner, M. et al. Simultaneous super-linear excitation-emission and emission depletion allows imaging of upconversion nanoparticles with higher sub-diffraction resolution. *Optics Express* 28, 24308-24326 (2020).

96. Liu, B. et al. Upconversion nonlinear structured illumination microscopy. *Nano Letters* (2020).

97. Schermelleh, L. et al. Super-resolution microscopy demystified. *Nature cell biology* 21, 72-84 (2019).

98. De Luca, G. M. et al. Re-scan confocal microscopy: scanning twice for better resolution. *Biomedical optics express* 4, 2644-2656 (2013).

99. Juette, M. F. et al. Three-dimensional sub-100 nm resolution fluorescence microscopy of thick samples. *Nature methods* 5, 527-529 (2008).

100. Schoen, I., Ries, J., Klotzsch, E., Ewers, H. & Vogel, V. Binding-activated localization microscopy of DNA structures. *Nano letters* 11, 4008-4011 (2011).

101. Szczurek, A. et al. Imaging chromatin nanostructure with binding-activated localization microscopy based on DNA structure fluctuations. *Nucleic acids research* 45, e56-e56 (2017).

102. York, A. G. et al. Instant super-resolution imaging in live cells and embryos via analog image processing. *Nature methods* 10, 1122-1126 (2013).

103. Demmerle, J. et al. Strategic and practical guidelines for successful structured illumination microscopy. *Nature protocols* 12, 988-1010 (2017).

104. Gustafsson, M. G. et al. Three-dimensional resolution doubling in wide-field fluorescence microscopy by structured illumination. *Biophysical journal* 94, 4957-4970 (2008).

105. Heintzmann, R. & Huser, T. Super-Resolution Structured Illumination Microscopy. *Chemical Reviews* 117, 13890-13908, doi:10.1021/acs.chemrev.7b00218 (2017).

106. Sheppard, C. J., Mehta, S. B. & Heintzmann, R. Superresolution by image scanning microscopy using pixel reassignment. *Optics letters* 38, 2889-2892 (2013).

107. Eggeling, C., Willig, K. I., Sahl, S. J. & Hell, S. W. Lens-based fluorescence nanoscopy. *Quarterly reviews of biophysics* 48, 178-243 (2015).

108. Huff, J. The Airyscan detector from ZEISS: confocal imaging with improved signal-to-noise ratio and super-resolution. *Nature methods* 12, i-ii (2015).

109. Korobchevskaya, K., Lagerholm, B. C., Colin-York, H. & Fritzsche, M. in *Photonics*. 41 (Multidisciplinary Digital Publishing Institute).

110. Jungmann, R. et al. Quantitative super-resolution imaging with qPAINT. *Nature methods* 13, 439-442 (2016).

111. Schnitzbauer, J., Strauss, M. T., Schlichthaerle, T., Schueder, F. & Jungmann, R. Super-resolution microscopy with DNA-PAINT. *Nature protocols* 12, 1198 (2017).

112. Dertinger, T., Colyer, R., Iyer, G., Weiss, S. & Enderlein, J. Fast, background-free, 3D super-resolution optical fluctuation imaging (SOFI). *Proceedings of the National Academy of Sciences* 106, 22287-22292 (2009).

113. Gustafsson, N. et al. Fast live-cell conventional fluorophore nanoscopy with ImageJ through super-resolution radial fluctuations. *Nature communications* 7, 1-9 (2016).

114. Chen, B.-C. et al. Lattice light-sheet microscopy: imaging molecules to embryos at high spatiotemporal resolution. *Science* 346 (2014).

115. Chang, J.-B. et al. Iterative expansion microscopy. *Nature methods* 14, 593-599 (2017).

116 Chen, F., Tillberg, P. W. & Boyden, E. S. Expansion microscopy. *Science* 347, 543-548 (2015).

117. Liu, W. et al. Breaking the Axial Diffraction Limit: A Guide to Axial Super-Resolution Fluorescence Microscopy. *Laser & Photonics Reviews* 12, 1700333 (2018).

What is claimed is:

1. An upconverting luminescent nanoparticle which exhibits photon avalanching, comprising:

a base material doped with at least 8% thulium.

2. The nanoparticle of claim 1, wherein a doping concentration of the thulium is at least 99%.

3. The nanoparticle of claim 1, wherein a near infrared excitation wavelength of the nanocrystals is greater than about 1064 nm.

4. The nanoparticle of claim 3, wherein the near infrared excitation wavelength is between about 1400 nm to about 1490 nm.

5. The nanoparticle of claim 1, further comprising at least one passivated shell surrounding the nanocrystals.

6. The nanoparticle of claim 5, wherein the nanoparticle is 100% thulium doped.

7. The nanoparticle of claim 1, wherein a passivating shell surrounding the nanoparticle is used to minimize surface losses at the surface of the nanoparticle.

8. A method for inducing photon avalanching, comprising:

providing a near infrared excitation wavelength to an upconverting luminescent nanoparticle which exhibits photon avalanching having nanocrystals with a thulium doping concentration of at least 8%.

9. The method of claim 8, wherein a doping concentration of the thulium is at least 99%.

10. The method of claim 8, wherein the near infrared excitation wavelength of the nanocrystals is greater than about 1064 nm.

11. The method of claim 10, wherein the near infrared excitation wavelength is between about 1400 nm to about 1490 nm.

12. The method of claim 8, further comprising at least one passivated shell surrounding the nanocrystals.

* * * * *